INVENTOR.
Robert S. Wallach
BY
ATTORNEY

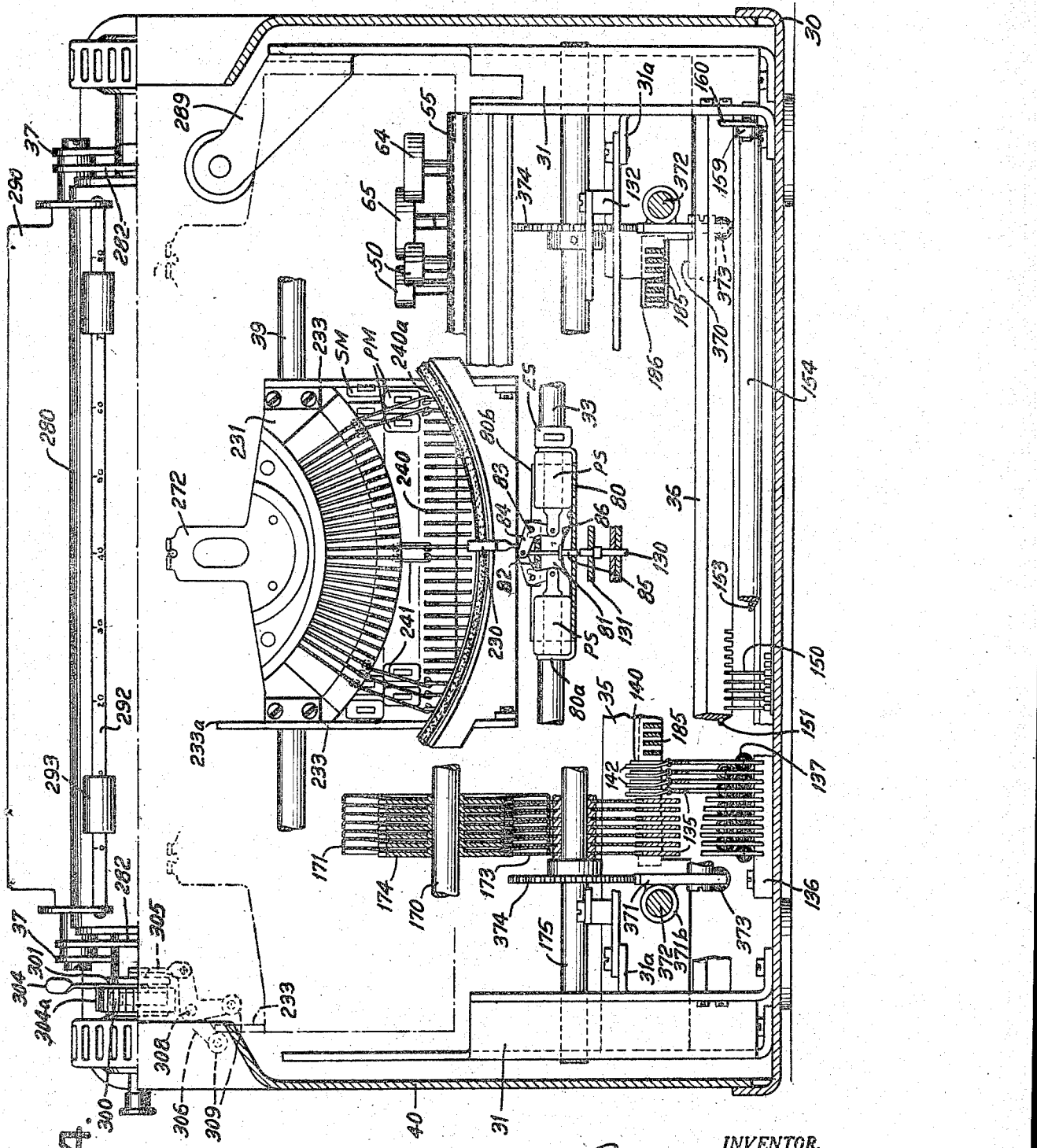

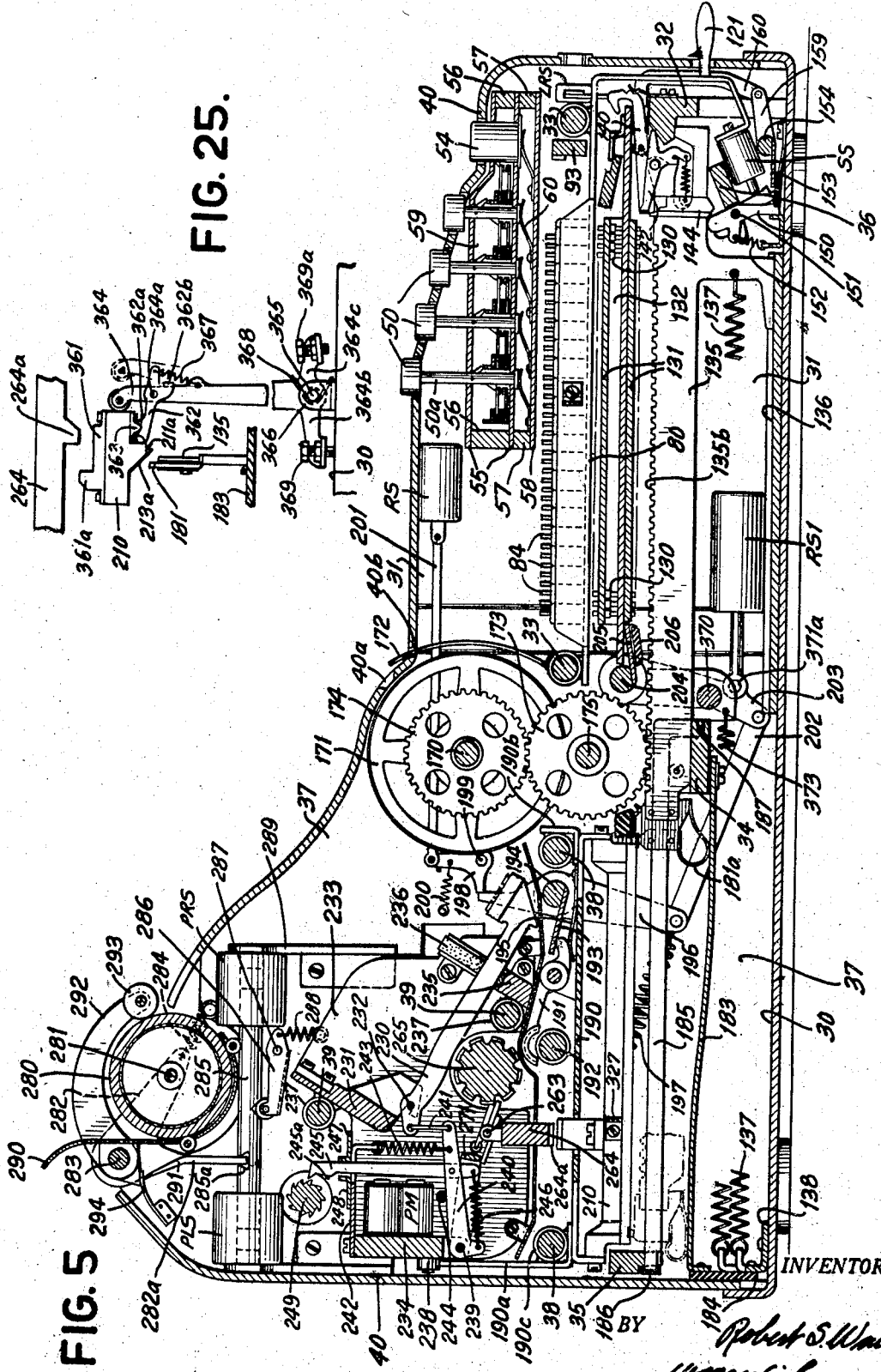

April 16, 1946.  R. S. WALLACH  2,398,457
TYPEWRITING MACHINE
Filed Sept. 16, 1943   13 Sheets-Sheet 6
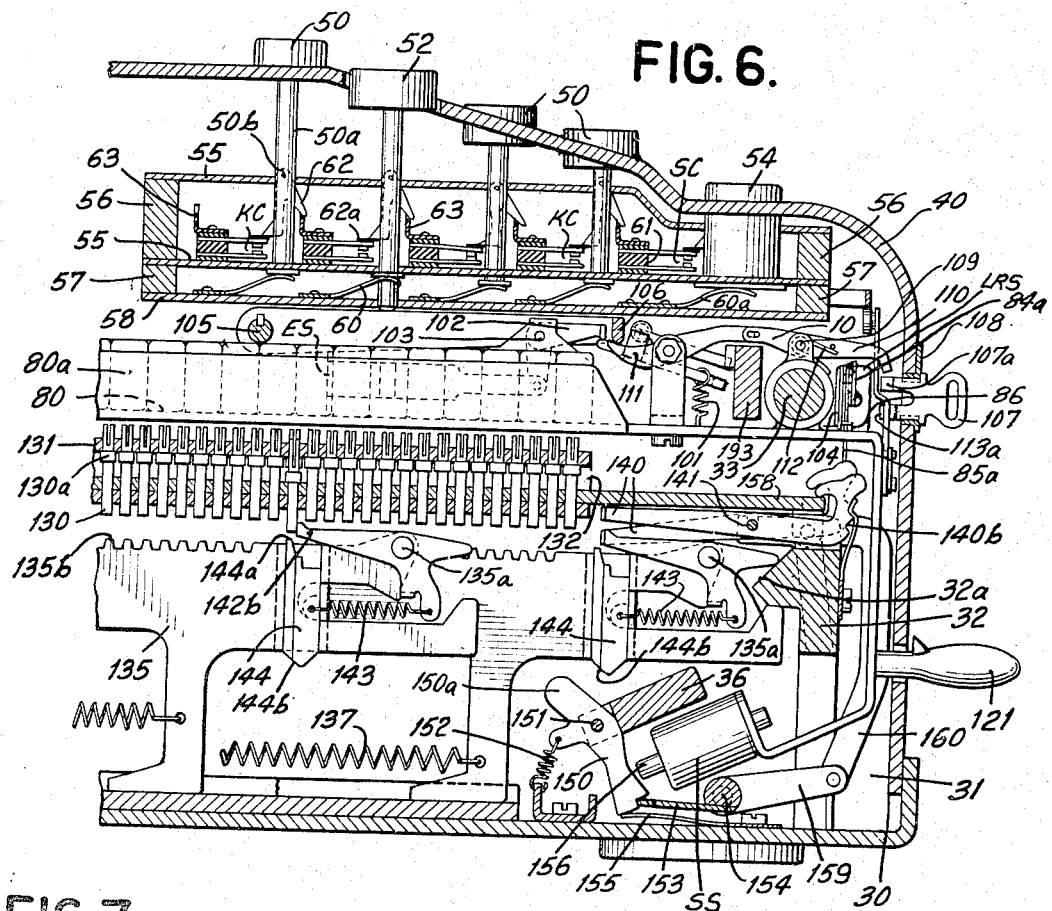

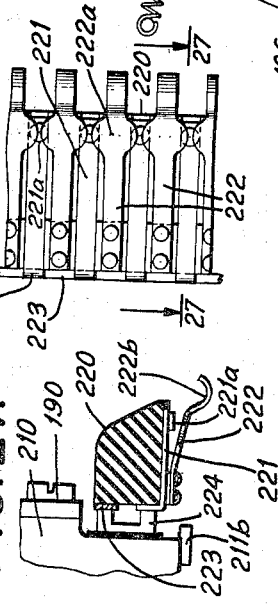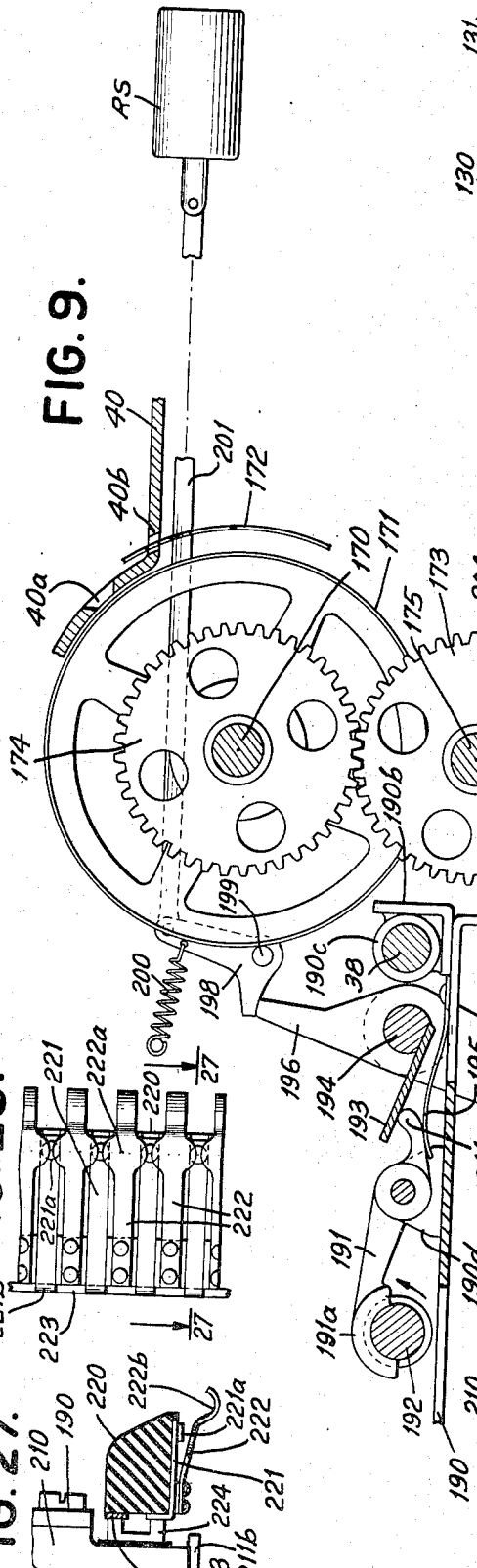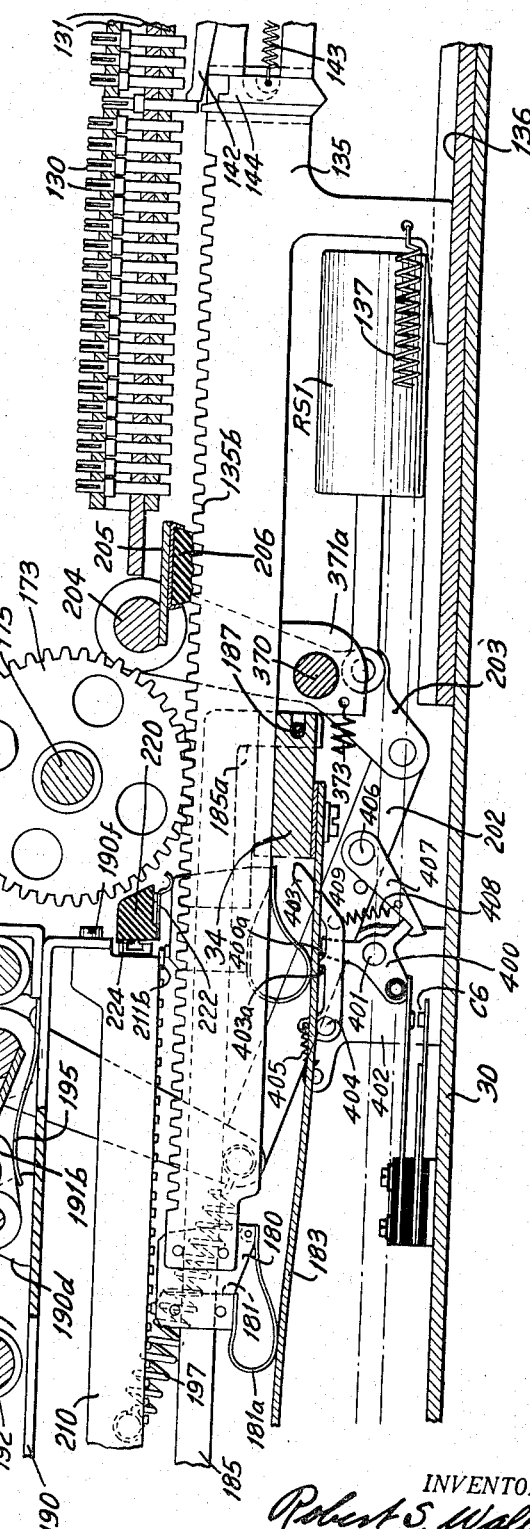

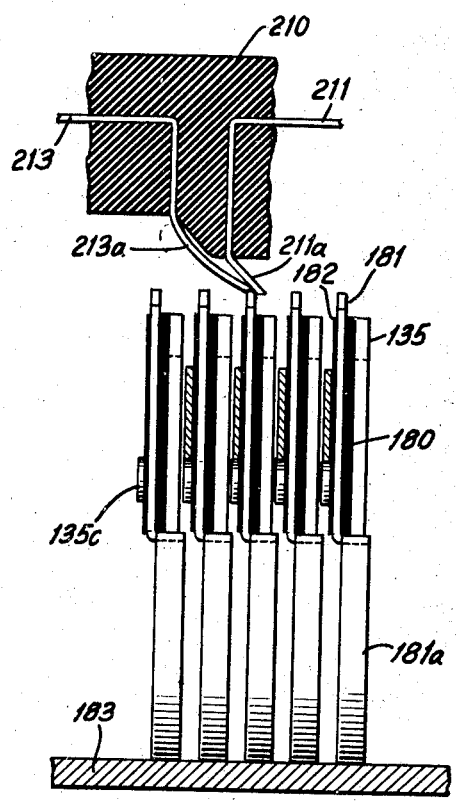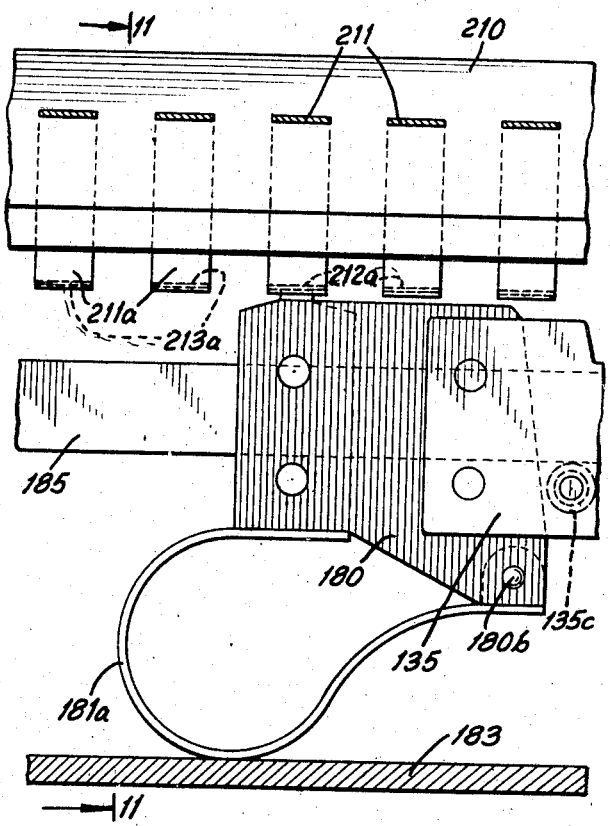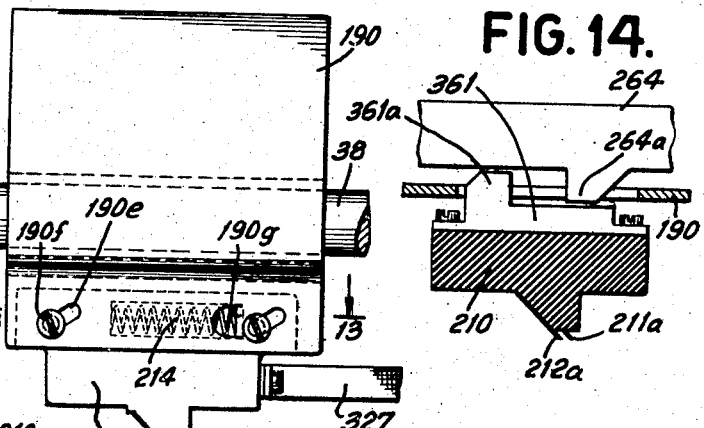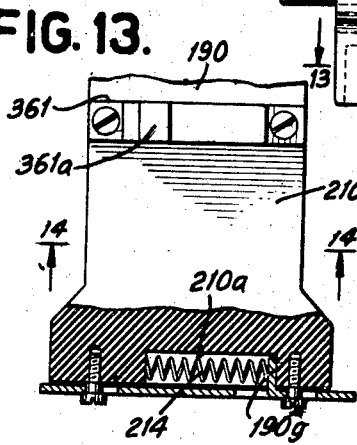

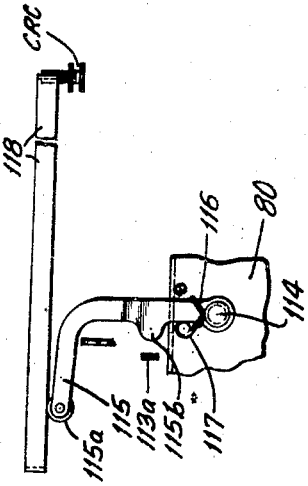
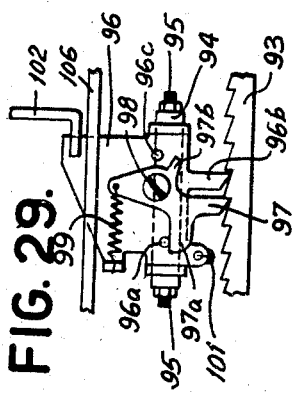
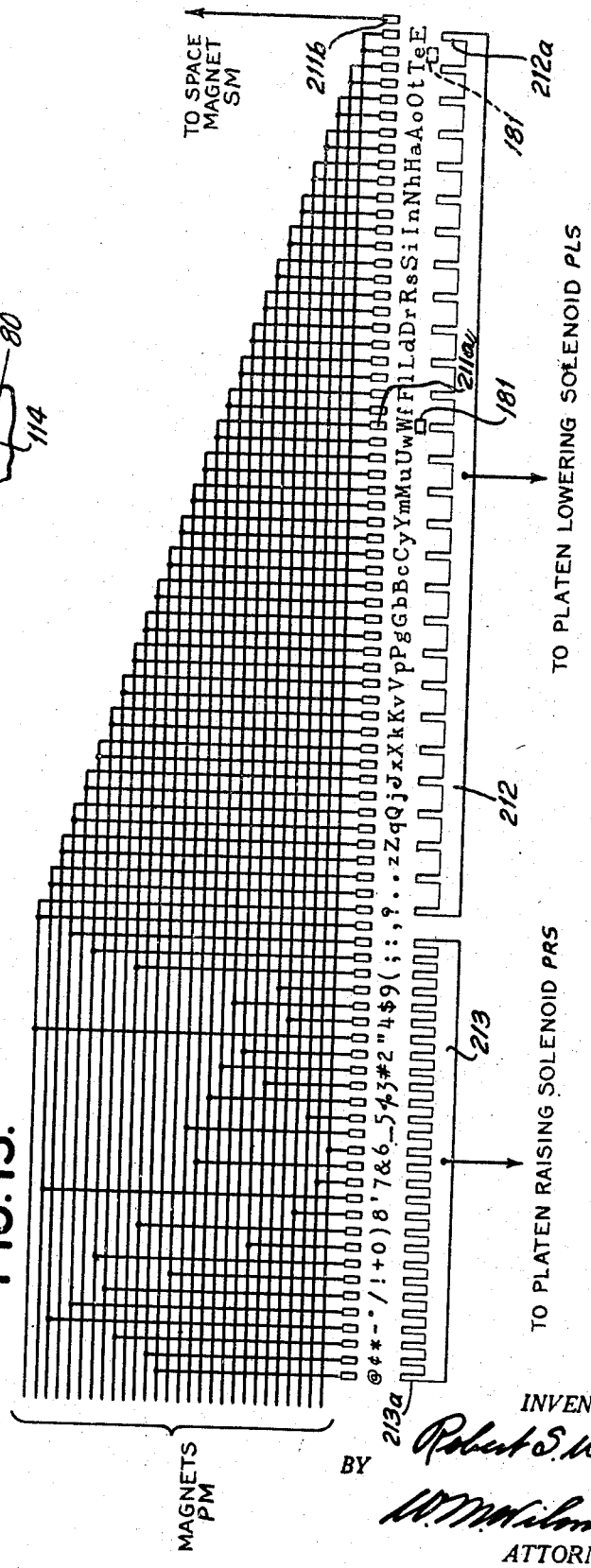

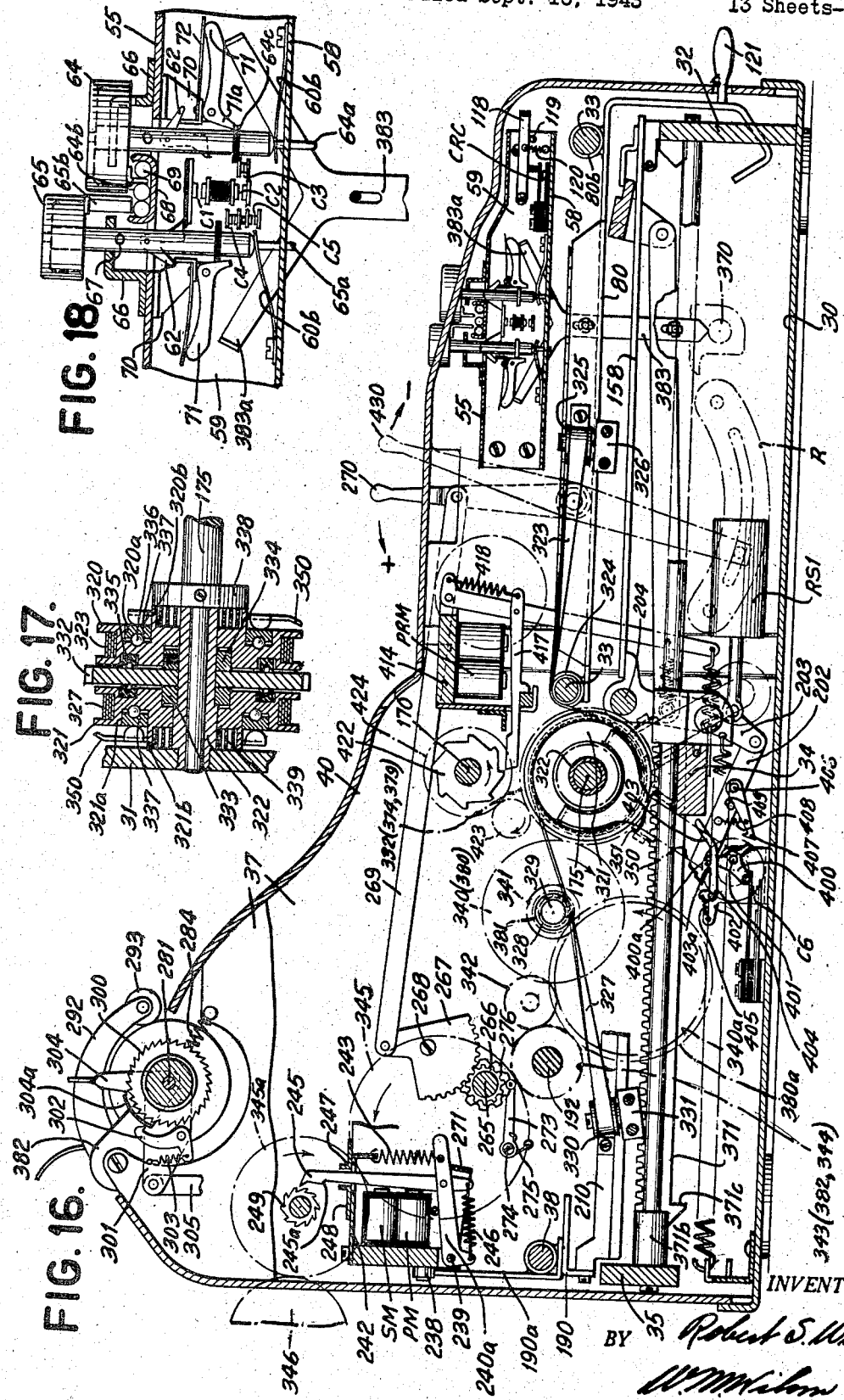

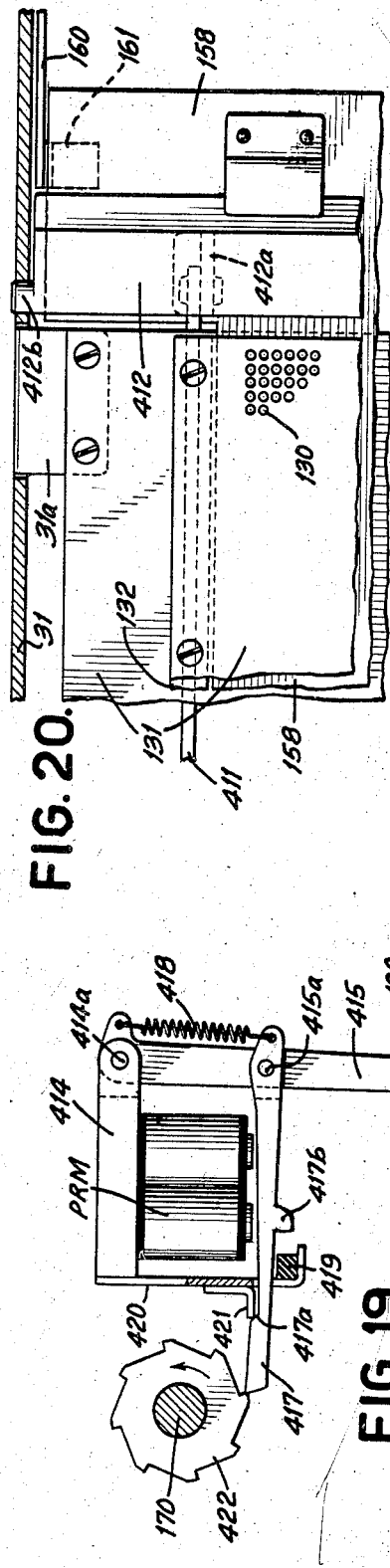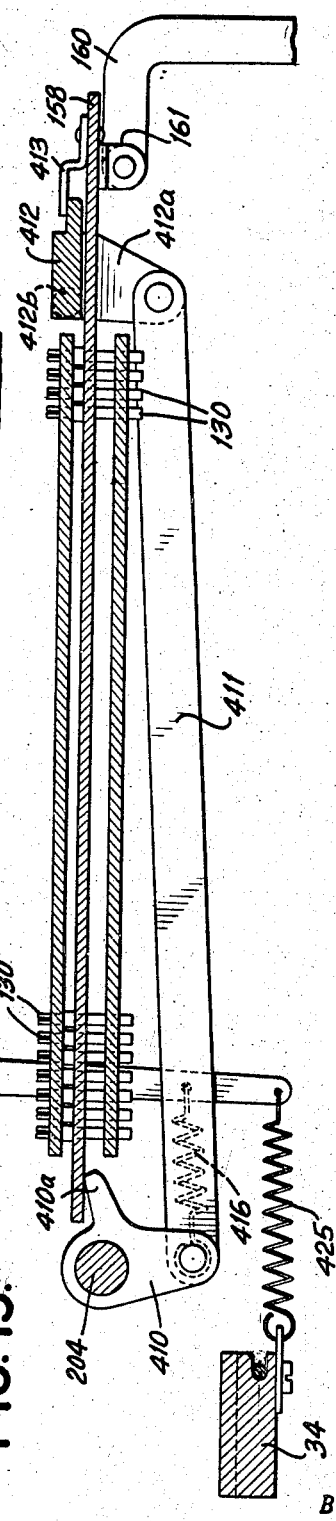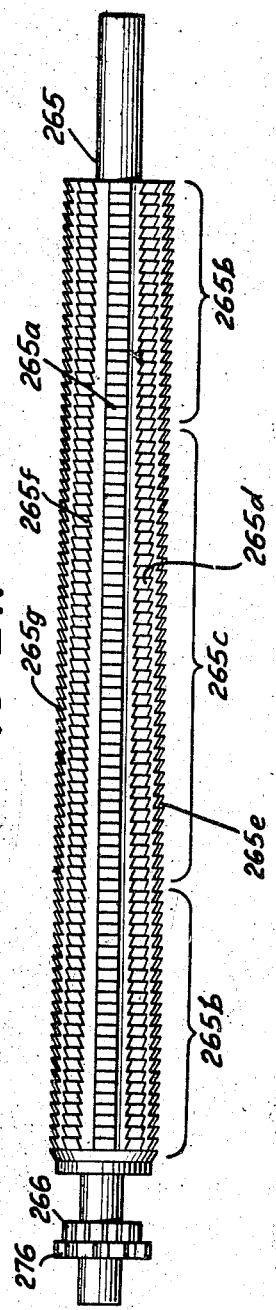

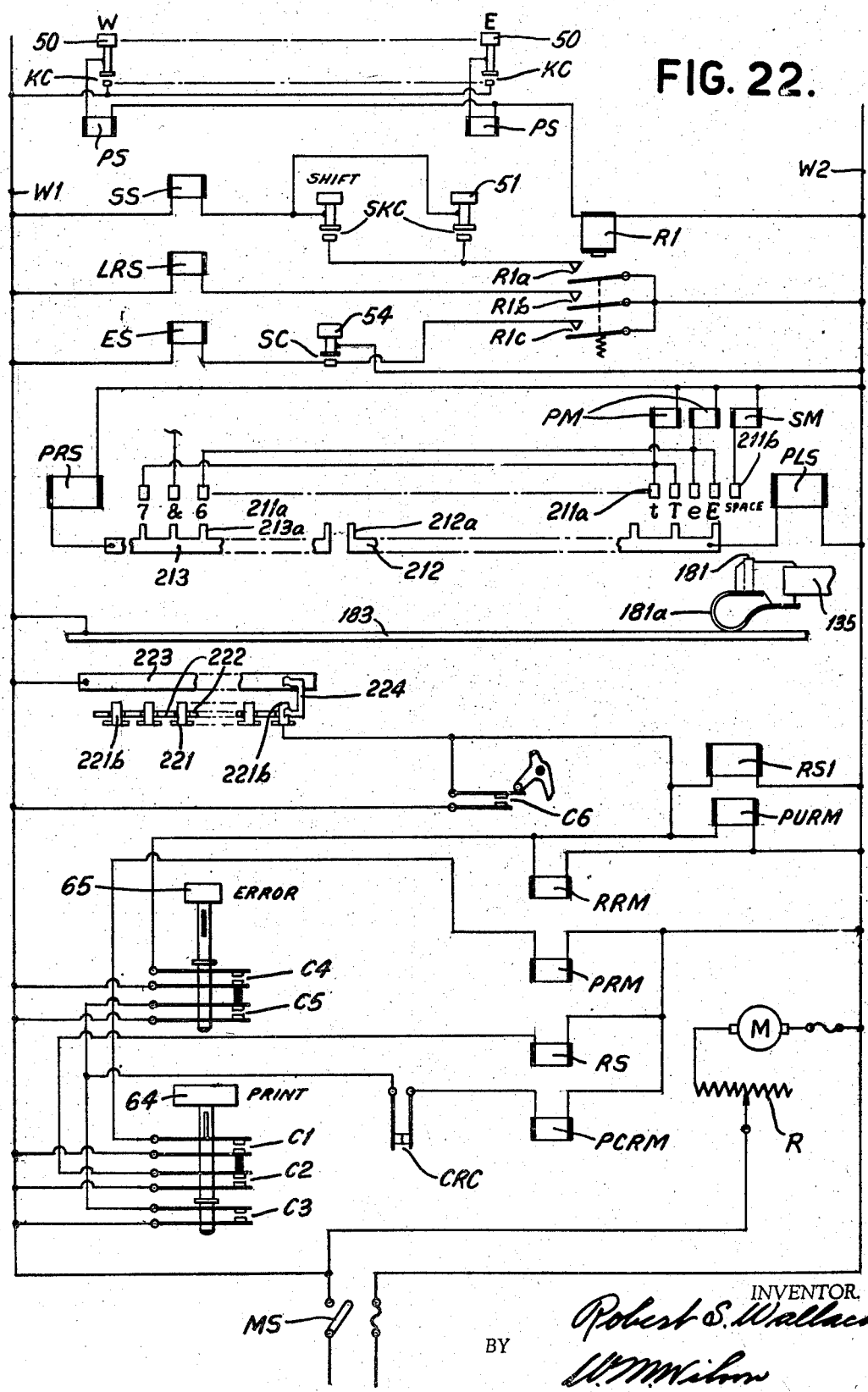

April 16, 1946.	R. S. WALLACH	2,398,457
TYPEWRITING MACHINE
Filed Sept. 16, 1943	13 Sheets-Sheet 13
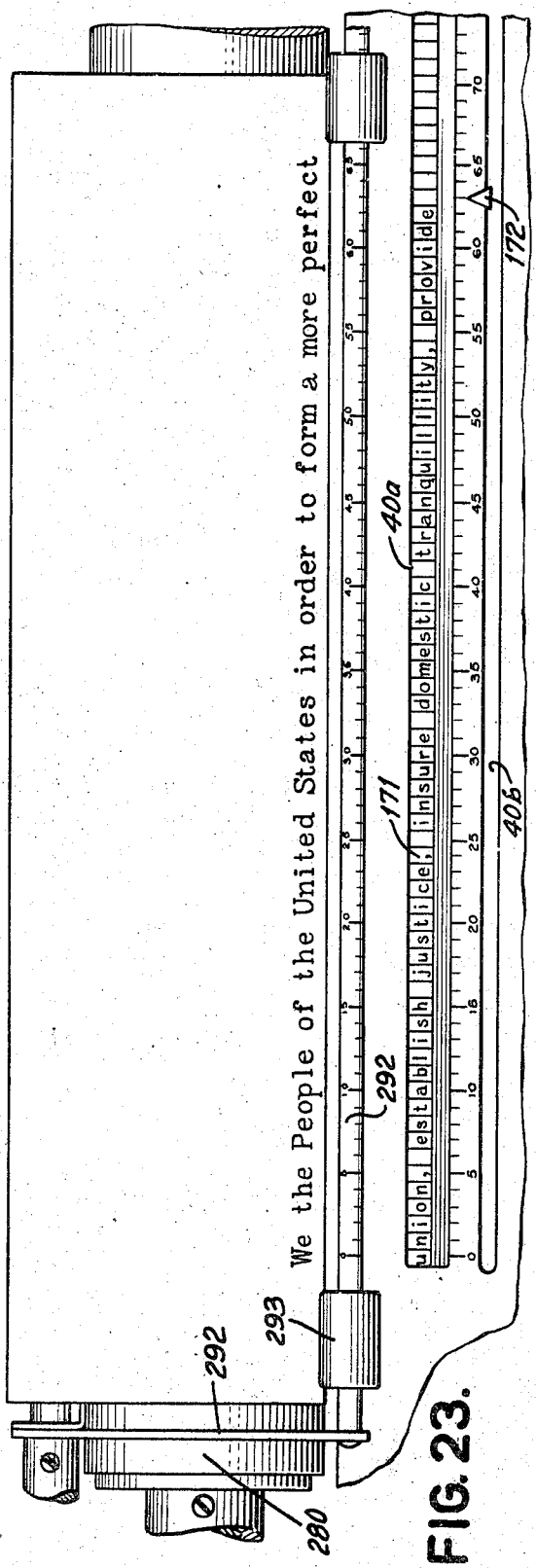
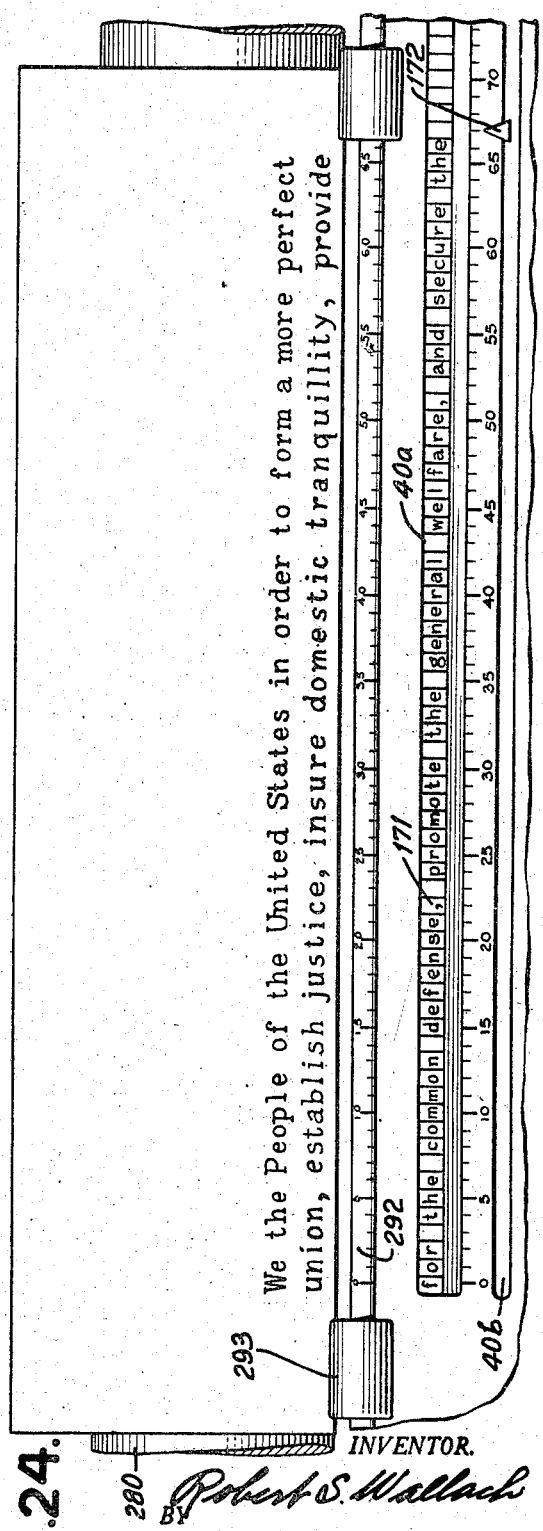
INVENTOR.
Robert S. Wallach
BY
ATTORNEY Patented Apr. 16, 1946

2,398,457

UNITED STATES PATENT OFFICE 2,398,457

TYPEWRITING MACHINE

Robert S. Wallach, Madison, N. J., assignor to Associated Development & Research Corporation, New York, N. Y., a corporation of New York Application September 16, 1943, Serial No. 502,599

31 Claims. (Cl. 197—19)

This invention relates to typewriting machines.

The primary object of the present invention is to provide a typewriting machine capable of producing justified copy without the necessity for first writing a preliminary draft of the matter to be printed before writing the justified copy.

An object is to provide a composing machine of such character that the operations of printing one line and composing a new line by manipulation of the keys may be overlapped to enable a higher rate of productivity of master copy to be attained.

An object is to provide a typewriting machine of such character that a line of writing may be set up in the machine and proof-read before the line is actually typed, in order to enable the operator to determine the amount of justification required, and if necessary, to correct any errors that may appear.

An object is to provide an indicator mechanism which may be controlled by keys to store and display a line of writing prior to its being typed in final form whereby it is possible to proof read and correct copy line for line at the time each line is written by the manipulation of the keys.

An object is to provide a novel data storage device capable of automatically controlling the printing mechanism of typewriters to print automatically the data stored thereon.

An object is to provide a novel electrically controlled typewriting machine.

An object is to provide a typewriting machine in which the printing of the characters is automatically effected at a uniform speed independently of the manipulation of the keyboard by the operator, thereby avoiding faulty alignment of capitals and other case shifted characters due to rhythm in manipulating the keys.

Another object is to provide an automatic printing mechanism having means to effect case shifting operations automatically and independently of the operator's rhythm in manipulating the keys.

An object is to provide a machine suitable for composing master copy sheets for photo-offset printing in which the composition may be preliminarily accomplished such as to permit visual consideration of each line and determination of the amount of justification required and the correction of errors, either typographical or in diction, before actually printing the master copy.

An object is to provide a typewriting machine of such nature that corrections, particularly in cutting stencils, may be made before the line is typed and without making erasures on the printed work sheet.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a transverse vertical section;

Fig. 5 is a vertical longitudinal section on the line 5—5 in Fig. 2;

Fig. 6 is a large scale vertical longitudinal section through the keyboard;

Fig. 7 is a large scale vertical section showing one of the storage racks set in case shift position;

Fig. 8 is a detail vertical section showing a storage rack at the end of its restoring stroke;

Fig. 9 is a large scale vertical longitudinal section of the indicator mechanism;

Fig. 10 is a greatly enlarged side view of the rear end of a rack and a portion of the sensing contacts;

Fig. 11 is a vertical section on the line 11—11 in Fig. 10;

Fig. 12 is a view of the rear end of the sensing carriage;

Fig. 13 is a horizontal section on the line 13—13 of Fig. 12;

Fig. 14 is a vertical section on the line 14—14 in Fig. 13;

Fig. 15 is a diagram showing the wiring and relation of the sensing contacts and rack contacts to the printing magnets and platen shifting magnets;

Fig. 16 is a vertical longitudinal section showing the rack restoring mechanism;

Fig. 17 is a vertical section on the line 17—17 in Fig. 3;

Fig. 18 is a large scale vertical section of the printing and error key mechanism;

Fig. 19 is a large scale vertical section of the pin restoring mechanism;

Fig. 20 is a plan view of a portion of the pin restoring mechanism;

Fig. 21 is a side view of the escapement rack member for the printing carriage;

Fig. 22 is a wiring diagram;

Figs. 23 and 24 are specimens of the work performed by the machine to illustrate the successive writing and justification of two lines;

Fig. 25 is a large scale detail view of the means for aligning the sensing carriage and printing unit carriage in starting position;

Fig. 26 is a bottom view of the contacts which automatically control restoration of the printing and sensing mechanism and the storage racks after typing of the last character in a line;

Fig. 27 is a large scale vertical section on the line 27—27 in Fig. 26;

Fig. 28 is a detail view of the mechanism for controlling the pin carriage return contacts; and Fig. 29 is a plan view of the escapement mechanism.

Main frame work

Figure 1:
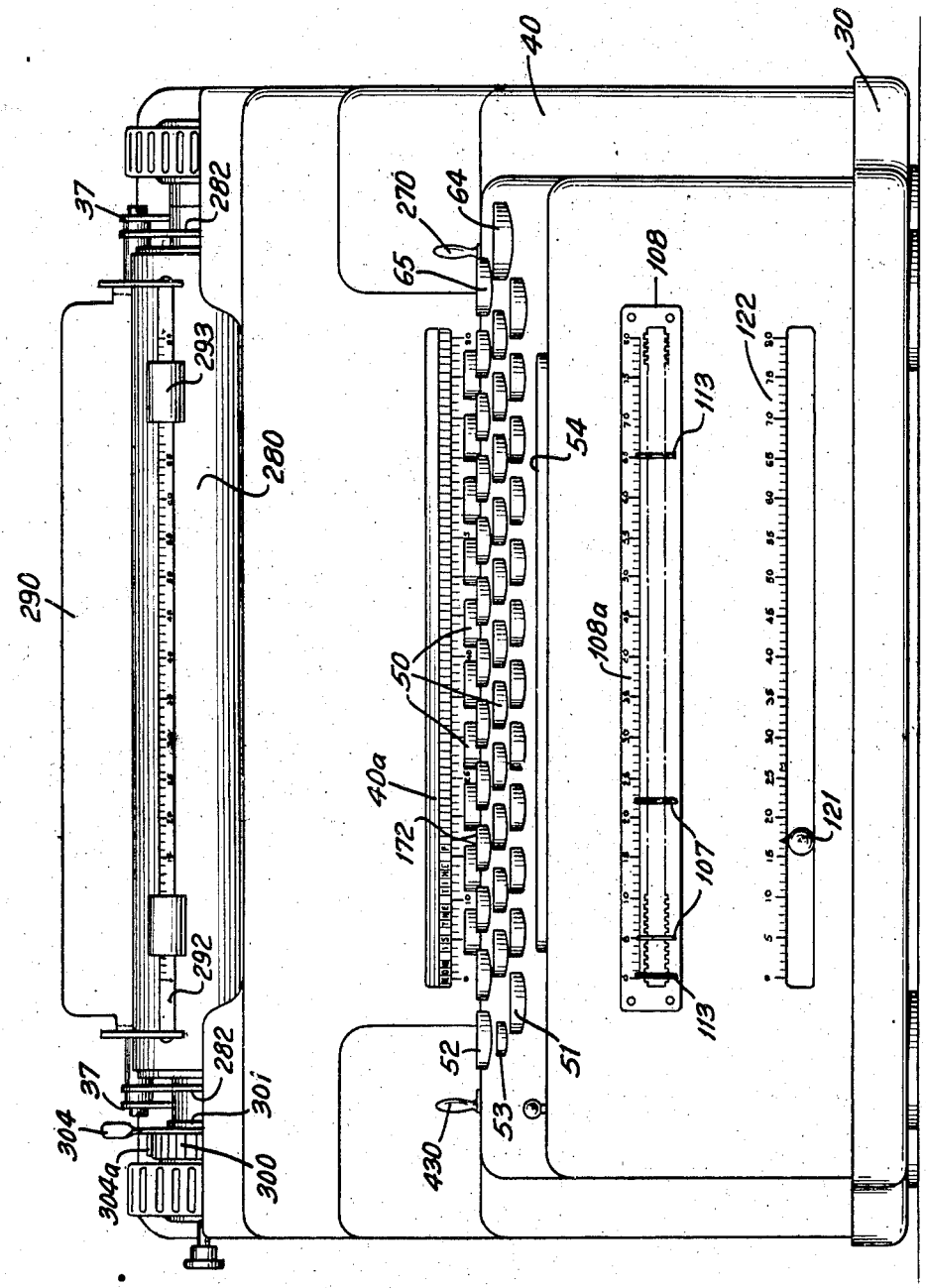
Fig. 1 is a front elevation of the machine.

The main frame work comprises a base 30 (Figs. 1 to 7, 9 and 16) to which is secured the vertical side plates 31 (Figs. 3, 4, 5, 16, and 20) which support the bulk of the mechanism of the machine. The side plates are rigidly joined together by a front bar 32, the cross rods 33 on which the pin carriage is slidably mounted, a rack guide bar 34, a rear cross bar 35, and a front cross bar 36. There is also provided a pair of supplemental frame plates 37 (Figs. 1, 2, 3, and 16) which are rigidly joined by the cross rods 38, on which the sensing carriage is slidably mounted, and by the cross rods 39 on which the printing carriage is slidably mounted.

The machine is enclosed by a suitable housing or cabinet 40 suitably shaped to conform to the mechanisms enclosed thereby, the base 30 being formed with a suitable flange overlapping the outer faces of the lower edges of the housing 40.

Keyboard

The machine is provided with a keyboard (shown in Figs. 1, 2, 5, 6 and 16) which, in respect to the arrangement of the character selecting keys 50, the shift keys 51, the tabulating key 52, the shift lock 53, and the space bar 54, is standard in arrangement and spacing of the keys to enable the touch system commonly employed in typewriting to be used.

The details of construction of the keyboard are shown in Figs. 5, 6, 16 and 18. The character keys 50 (Figs. 5 and 6) have their key caps located in holes in the casing 40 and their stems 50a are vertically guided between plates 55 which are spaced from each other by bars 56 secured to the front and rear edges of the plates 55. Spaced from the lower plate 55 by means of bars 57, is a bottom plate 58. The top plate 55 and the bottom plate 58 are secured to the inside vertical faces of the side plates 31 by means of bars 59 which also space the top plate 55 and bottom plate 58 apart at the ends.

Secured to the top surfaces of the bottom plate 58 are the leaf springs 60 which engage the enlarged lower ends of the stems 50a of the character keys 50 and urge them upwardly. The shift keys 51, the tabulating key 52, and the shift lock key 53 are mounted in similar fashion, except that the stem of the tabulating key 52 extends through the bottom plate 58 (Fig. 6) and its spring 60 is bifurcated to engage a flange on the stem of the key instead of bearing against the lower end of the key stem. The stems of all of the keys so far mentioned are provided with enlarged lower ends engaging the lower plate 55 to limit upward movement of the keys.

The space bar 54 (Figs. 5 and 6) is received in a long slot in the cabinet 40 conforming to the shape of the space bar and is guided by the plates 55 which are provided with slots similar to the one in cabinet 40. The space bar 54 is also provided with springs 60a at its ends and is formed with a flange engaging the lower plate 55, which springs hold the space bar in the elevated position and which flange limits upward movement of the bar.

All of the keys mentioned so far, with the exception of the tabulating key 52, actuate electrical contacts which, as will be seen later, control the setting of pins to represent the characters or, in the case of the shift keys 51 and the space bar 54, control magnets which effect case shift selections and spacing of the pin carriage, respectively. For this purpose there is mounted on the top surface of the lower plate 55, a number of parallel strips of insulating material 61 (Fig. 6) between which are clamped the key contacts KC, there being a pair of contacts like the contacts KC for each of the keys 50, 51. The contacts actuated by the keys 51 and 53 are designated SKC in Fig. 22. There is also a pair of contacts SC (Fig. 22) located at about the middle of the space bar 54 for controlling the magnet which actuates the escapement mechanism for the pin carriage.

The stems 50a of all of the keys except the tabulating key 52, are vertically slotted to receive a contact actuating member 62 pivoted to the key stems at 50b. The members 62 are shaped somewhat like levers, one arm of which extends over a strip of insulating material 62a on the free end of the upper contacts KC whereby, when the key is depressed, illustrated by the middle key 50 in Fig. 6, the contacts KC will be closed. The other arm of the member 62 overlies a flange 63 in an angular strip which is used to clamp the contact strips to the plate 55, and when the key is depressed, urges the members 62 in a counterclockwise direction. When the depressed key nears the end of its stroke, the member 62 will be rocked counterclockwise far enough to clear the insulating strip 62a of the associated upper contacts KC and allow the contact to become restored under spring tension, thereby opening the contacts KC. By this means, the closure of the contacts KC is momentary and enables the character selecting magnet connected thereto to be immediately de-energized, notwithstanding the possibility that the key may be held depressed by the operator. When the depressed key is released, the member 62 wipes idly by the upper contact KC without disturbing the latter, and is restored to the position shown in Fig. 25 by gravity. The space bar 54, near its middle, pivotally supports a member 62 which actuates the contacts SC in similar fashion.

The keyboard includes a printing key 64 and an error key 65 which are located at the right hand end of the keyboard (Fig. 2), the details of construction of which are best shown in Fig. 18. The stems of keys 64, 65 vertically guided by Z-shaped brackets 66 secured to the top surface of the top place 55 and at their lower ends are formed with reduced portions 64a, 65a guided in holes in the plate 58. Springs 60b, which are bifurcated at their ends to straddle the reduced portions 64a, 65a, urge the keys 64, 65 upwardly. Pins 67 on the key stems, limit upward movement of the keys by engagement with the brackets 66.

Since it is desirable that only one of the keys 64, 65 be depressible at a time, there is provided a conventional key arrestor consisting of a channel shaped retaining member 68 in which are located the balls 69. The key caps are provided with extensions 64b, 65b and the balls are of such size that when either key is depressed, its associated extension 64b or 65b will spread the balls so as to prevent the other key from being depressed more than a small amount.

The keys 64, 65 are provided with members 62, as in the case of the other keys, both of which members coact with the upper contact member of a pair of contacts C1 such that when either key 64, 65 is depressed, the contacts C1 will be closed by the first part of the movement of the key. With continued movement of the key, the lower contact member of the contact C1 is operative to close a second set of contacts C2. However, when the key 65 is depressed, the member 62 associated therewith disengages from the upper contact member C1 before the contact C2 can be closed. Thus, the key 64 closes both contacts C1 and C2 but key 65 only closes contact C1.

The key 64 is provided with an insulating flange 64c which engages contacts C3 to close said contacts near the end of the downward stroke of the key. The key 64 is similarly arranged to close contacts C4, C5 near the end of the downward stroke of the key 65. The rotation of the members 62 will disengage them from the upper contact member C1 and is accomplished by lugs formed in brackets 70 secured to the underside of the top plate 55. Also pivoted on the brackets 70 are key locking detents 71 which are urged in opposite directions by leaf springs 72 secured to angular lugs on the brackets 70. When the keys 64, 65d have been depressed to the fullest extent, the noses 71a in the detents 71 snap over the insulating flanges 64c and hold the keys 64, 65 depressed.

*Pin carriage*

Figure 3:
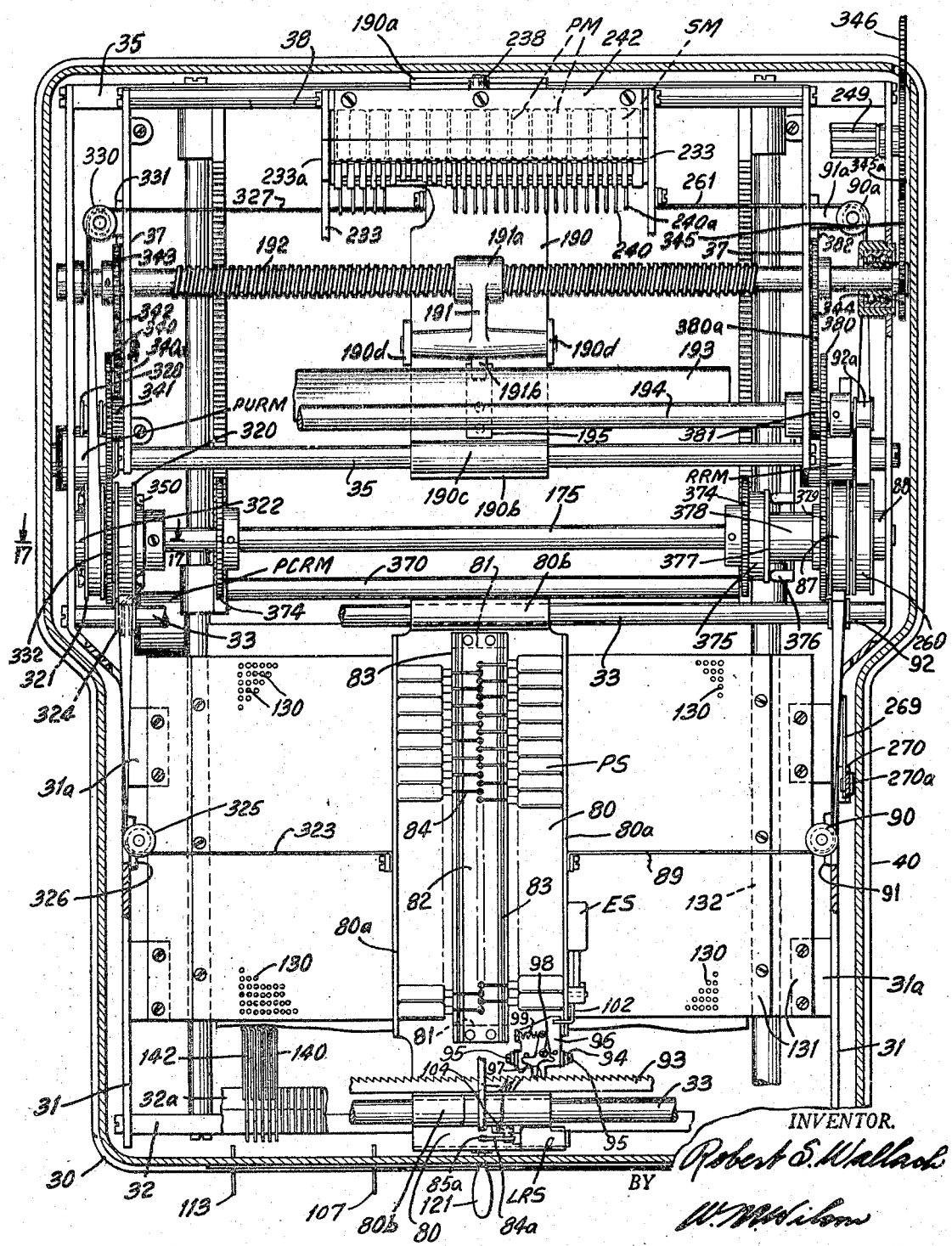
Fig. 3 is a horizontal section.

The character keys 50 control a pin setting carriage which is used to set pins controlling a storage device to retain a representation of the character corresponding to the key depressed. This pin carriage is shown in Figs. 3 to 6, and 16 and is slidable on the cross rods 33. The main frame of the carriage consists of a channel shaped plate 80 having up-turned flanges 80a, which plate is secured to sleeves 80b through which the rods 33 pass. Supported on blocks 81 (Figs. 3 and 4), which are secured to the top surface of the plate 80, is a comb bar 82 disposed longitudinally of the plate 80 and transversely of the rods 33. This bar 82 is slotted longitudinally near both its longer edges to support pivot wires 83, and also is slotted transversely to guide the levers 84 which are pivotally mounted on the wires 83, the levers being staggered as shown in Fig. 3. The vertical arms of the levers 84 (Fig. 4) are pivotally connected to the plungers of the pin selection solenoids PS of which there is one for each of the keys 50. The other arms of the levers 84 are pivotally connected to the setting pins 85 which are guided at their lower ends in holes in the plate 80. The pins 85 have enlarged portions which are engaged by leaf springs 86 urging the pins upwardly. Whenever a solenoid PS is energized under the control of its associated key 50, the corresponding lever 84 is rocked on pivot wire 83 to thrust the setting pin 85 downwardly. As will be seen hereinafter, this will result in setting one of the pins in the pin bank to store a representation of the character which is to be subsequently printed.

Normally the pin carriage is urged to the right in Figs. 3 and 4 by a spring motor designated 87 in Fig. 3, which is mounted on a bushing 88 secured to the right hand frame plate 31. A tape 89, connected to the right hand flange 80a of the pin carriage, passes around a pulley 90 carried by a bracket 91 secured to plate 31 and over the pulley 92 on the rear rod 33 and is connected to the spring motor 87.

For the purpose of spacing the pin carriage, conventional escapement mechanism is provided which is mounted on the pin carriage and cooperates with a rack 93 (Figs. 3, 5, 6, and 29) secured at its ends to the frame plates 31. This escapement mechanism is most clearly shown in Fig. 29 and is of a type commonly used in typewriting machines. Secured to the top of the plate 80 near its front, there is a bracket 94 (Figs. 3, 6, and 29), the up-turned ears of which are provided with pivot screws 95 supporting a rockable plate 96 on which the loose dog 97 is pivoted at 98. Normally the dog 97 engages the rack 93 as shown in Fig. 6 with the tail 97a (Fig. 29) of the dog engaging a stop pin 96a carried by the plate 96. A spring 99, anchored to an ear in the plate 96 and to the loose dog 97, tends to rock said dog in a counterclockwise direction, but on account of the fact that the spring motor 87 constantly tends to draw the pin setting carriage 80 to the right, the tail 97a of the dog 97 will be held against the pin 96a.

The plate 96 is formed with a holding dog or tooth 96b which ordinarily is clear of the teeth of the rack 93. When the plate 96 is rocked counterclockwise in Fig. 6, the dog 96 moves into a tooth space of the rack 93 before the loose dog 97 clears the tooth which it happens to engage. As soon as the dog 97 is clear of the tooth, the spring 99 rocks the dog 97 in a counterclockwise direction until the stop lug 97b in the dog engages a pin 96c carried by the plate 96. The plate 96 is restored by a spring 101 anchored to an ear formed in the plate 96 and to the plate 80. When the plate 96 is restored by spring 101, the dog 97 re-enters the next adjacent tooth on the right in the rack 93 now receiving the dog 96b before the dog 96b clears the rack, and, with full restoration of the plate 96, the pin carriage is released and allowed to move one tooth space to the right during which the tail 97a of the loose dog 97 re-engages pin 96a.

For the purpose of operating plate 96 to space the pin carriage, there is provided an escapement solenoid ES mounted on the right hand flange (Fig. 3) of the plate 80. The plunger of this solenoid is connected to the vertical arm of a lever 102 pivoted at 103 to an upward extension of the right hand flange 80a. The horizontal arm of the lever arm 102 has an offset lug which, as shown in Figs. 3, 6, and 29, overlies the rear end of the plate 96, whereby energization of the solenoid ES rocks the lever 102 clockwise in Fig. 6, to actuate the escapement.

For a purpose which will be made clear hereinafter, the shift keys 51 control a solenoid designated LRS which may be termed the latch release solenoid. This solenoid is similar to the solenoids PS and controls a pin 85a similar to the pins 85 and in alignment therewith. The solenoid LRS actuates a lever 84a similar to the lever 84, which lever is pivoted on a bracket 104 mounted on the plate 80.

Means is provided to enable the tabulating key 52 to release the escapement mechanism to enable the carriage to be tabulated from one position to another. Secured to a shaft 105 (Fig. 6) journaled in plate 31 is a bail 106 which extends parallel with escapement rack 93 and overlies the plate 96 (Fig. 29). One of the arms of the bail 106 is engaged by the stem 50a of the tabulating key 52 whereby the depression of the tabulating key causes the bail 106 to rock clockwise in Fig. 6, thereby depressing the plate 96 and moving said plate counterclockwise far enough to disengage both of the dogs 96b, 97 from the rack 93. This permits the pin carriage 80 to run free under the influence of spring motor 87.

For the purpose of arresting the carriage in the desired columnar positions, the machine is provided with tabulating stops designated 107 (Figs. 1, 3, and 6) which are inserted in slots in a plate 108 secured to the cabinet 40, the latter being provided with a suitable slot through which the stops 107 extend. The tabulating stops are formed with two prongs of which the longer one 107a (Fig. 6) is disposed at the top and extends rearwardly toward the pin carriage or to the right in Fig. 6. Pivoted at 109 is a tabulating counter stop lever 110 which has a pin and slot connection with a lever 111 having an arm extending underneath the bail 106. The lever 110 is actuated in a counterclockwise direction by a spring 112 so that normally the front or right hand end (Fig. 6) of lever 110, which is shaped like a finger, is clear of the lug 107a. When the bail 106 is rocked clockwise (Fig. 6), in consequence of depression of the tabulating key 52, the lever 110 will be rocked clockwise by the lever 111 into the path of the lug 107a before the bail 106 effects the release of the escapement as described above. The carriage then will be free to move, as explained above, and ultimately will be stopped by the lug 107a of the nearest stop 107 to the right of the carriage 80, with reference to Fig. 3.

In order to control the extent of return of the carriage and arrest the carriage in a marginal position, there is provided a pair of marginal stops 113 which are similar to the tabulating stops 107 except that the stops are turned when inserted, so that the lug 113a, which is the counterpart of the lug 107a, is at the bottom, as shown in Fig. 6. The plate 80 forming the frame of the pin setting carriage is bent at a right angle downwardly, as shown in Fig. 6, and to the side of this vertical portion there is pivoted at 114 a goose-neck shaped lever 115. A torsion spring 116 urges the lever 115 in a counterclockwise direction (Fig. 28) to hold the lever 115 against a stop pin 117 on the plate 80. The upper end of the lever 115 is provided with a roller 115a engaging a bail 118 pivoted at its ends on the blocks 59 which support the keyboard, as shown in Fig. 16. The right hand arm of the bail 118 bears an insulating button which engages one of a pair of contact members CRC so as to hold said contacts closed. The arms of the bail 118 rest on stop pins 119 carried by the blocks 59, and are urged in a clockwise direction by springs 120 anchored to the arms of the bail.

The lever 115 is bent near its middle, as shown in Figs. 6 and 28, so that it can pass by the lugs 107a of the tabulating stops 107, but is shaped with a rounded nose 115b adapted to engage the lug 113a of the right hand marginal stop 113. When the pin carriage is returned, as hereinafter described, the nose 115b strikes the lug 113a and rocks the lever 115 in a clockwise direction (Fig. 28) thereby lifting bail 118 and permitting the contacts CRC to open. As will be made clear hereinafter, this will de-energize the magnet which engages the clutch controlling the return of the pin carriage to the right hand marginal position.

The downwardly extending portion of the plate 80 is bent as shown in Fig. 6, to support a shift latch solenoid SS which is controlled by the shift keys 51 in a manner to be explained hereinafter, and is also provided with a handle 121 which may be used to shift the pin carriage by hand, when desired. The handle 121 is provided with a suitable pointer thereon which cooperates with a scale 122 (Fig. 1) arranged along a slot in the cabinet 40 through which the handle 121 projects. This scale 122, like a similar scale 108a on the plate 108, is graduated according to columnar positions of the carriage 80.

Storage mechanism

The mechanism for storing a representation of each character is located in the base of the machine and includes a bank of settable pins over which the carriage 80 travels to select columns of pins in each of which a pin is selectively set to represent a character. The pins are designated 130 and are frictionally slidably mounted in two plates 131 (Figs. 3 to 7, 9, 19 and 20) which are spaced from each other by bars 132. The lower plate 131, as shown in Figs. 3 and 20, is longer than the top plate and is secured to bent-over lugs 31a formed in the side plates 31. There are 42 pins in each row which extend longitudinally of the machine, that is, vertically with respect to Fig. 3 and there is a row of pins for each space or column for which there is a graduation on the scales 108a, 122 (Fig. 1). The drawings show a machine which has a storage capacity of 80 characters or spaces in one line. Accordingly, the adjacent scales are graduated up to 80.

As shown in Fig. 6, the upper ends of the pins are slotted and they are slightly expanded to give them sufficient friction in the holes in the upper plate 131 to enable the pins to remain in either the upper or the lower position. The pins are also formed with collars 130a which act as stops to prevent them from being pushed too far in either direction. Normally all of the pins occupy the upper position. When the pin setting carriage 80 is aligned with the pointer on the handle 121, opposite a selected graduation on the scale 122, the setting pins 85 on the pin carriage 80 will register with the pins 130 of the row for the column in which the pin carriage is set, whereby if any of the solenoids PS is energized, a corresponding pin 130 will be pushed downwardly as illustrated by the 11th pin from the left in Fig. 6. Each pin, when depressed, represents both the upper and lower case characters of a letter of the alphabet or one of the usual combinations of characters represented by a single key in a conventional typewriting machine.

Associated with each row or columns of pins 130 is a storage rack 135 (Figs. 4 to 7, and 9), the right hand end of which is guided in a groove in a guide plate 136 secured to the base 30. The left hand ends of the racks 135 are supported and spaced from each other by transverse horizontal slots in the bar 34 and the racks are urged to the left by springs 137 anchored to bent over lugs in an angle bar 138 secured to the base 30 at the rear of the machine. Normally the racks 135 are prevented from moving to the left by means of latches 140 (Figs. 5 to 8) pivoted on a wire 141.

The latches 140 are guided by transverse slots in the bar 32 which form a comb and the ends of the teeth formed by the slots are slotted longitudinally of the bar to support the pivot wire 141 in a well-known way. The latches 140 have bent-over lugs 140a which normally occupy a position in front of detents 142 which are pivoted at 135a on the right hand ends of the racks and are urged in a clockwise direction by springs 143. The detents 142 are formed with bent-over lugs 142a which engage a part of the rack 135 to limit clockwise movement of the detents. The springs 143 are anchored to stop members 144 which are vertically slidable in dove-tail slots in the racks 135. Normally the stops 144 are in their lower positions, as shown in Fig. 6, but are capable of being projected upwardly so that a tooth 144a in the upper end is positioned in horizontal alignment with the end of arm 142b as shown in Fig. 7, by the stop 144 at the left.

When the pin carriage is aligned with respect to any column or row of pins 130, the latch 140 for such column will be aligned with the pin 85a which is actuated by the latch release solenoid LRS. As will be made clear hereinafter, whenever a solenoid PS is energized, the solenoid LRS will also be energized, and its pin 85a will press down the arm 140b (Fig. 6) of the latch 140 which happens to be in alignment with the pin 85 and this will occur simultaneously with the setting of the pin 130 by the solenoids PS. This completely frees the rack 135 for the selected row of pins, since the lug 140a will be removed from horizontal alignment with the end of arm 142b of the detent 142 thereby permitting the spring 137 to draw the rack 135 to the left until the end of the arm 142b engages the set pin, as illustrated by the foremost rack 135 in Fig. 6. In this manner the racks are selectively positioned to represent a character. Unless the stop 144 is pushed upwardly, as illustrated at the left in Fig. 7, the rack will be positioned to represent a lower case character.

Provision is made for actuating stops 144 to arrest the racks 135 in positions intermediate the pins to represent the case shifted characters and it is for this purpose that the movable stops 144 are provided. The bar 36, as most clearly shown in Figs. 6 and 7 is slotted transversely to guide a series of detents or cam members 150 pivotally supported by means of a fulcrum wire 151 in a longitudinal slot in the bar 36. The members 150 are urged in a counterclockwise direction (Figs. 6 and 7) by springs 152 and their lower ends are provided with a latching shoulder which normally is just clear of a restoring plate 153 secured to a shaft 154 journaled in side plates 31. There is a member 150 for each of the racks 135 and the members 150 are located in the plane of the stops 144. The bar 36 acts as a stop to limit counterclockwise rotation of members 150 under the influence of springs 152.

The lower ends of the detents adjacent the latching shoulders are engaged by latch springs 155, of which there is one for each member 150. Each member 150 is provided with a cam portion 150a which is normally horizontally clear of the path of a cam surface 144b formed in the lower end of the adjacent stop 144. The cam members 150 are also in alignment with the plunger 156 of the shift latch solenoid SS.

When the pin carriage 80 is positioned with its row of pins 85 in alignment with the row of pins 130 corresponding to a particular rack 135, the plunger 156 of the solenoid SS will be positioned in alignment with cam member 150 and provisions are made, when a solenoid PS is energized with a shift key 51 held depressed, for energizing the solenoid SS to rock the cam member 150 with which it is in alignment in a clockwise direction far enough for the latch spring 155 to enter the latching shoulder in the cam member. This spring then holds the cam nose 150a into the path of the cam surface 144b. Since at this time the solenoid RLS is energized to release the rack 135, as explained above, the movement of the rack to the left in Fig. 6 causes the stop 144 to be cammed upwardly by cam portion 150a to position the tooth 144a of the stop 144 in horizontal alignment with the end 142b of the detent 142 for the same rack. This causes the rack for which a stop 144 has been thrust upwardly to be arrested in an intermediate position, as shown at the left in Fig. 7.

When the racks 135 are restored in a manner hereinafter to be described, they are positively moved to the right, Figs. 6 and 7. Near the end of the restoring stroke of the racks, arms 142c formed in the detents 142 engage a cam surface 32a in the bar 32 and the detent member 142 is rocked in a counterclockwise direction. In restoring the racks, they are pushed a little further to the right than in Fig. 6. For the purpose of restoring the stops 144, it will be noted in Figs. 6 and 7 that the stops 144 are cut away adjacent the teeth 144a to provide shoulders which are engaged by the lugs 142b of the detents when stops 144 have been set as at the left in Fig. 7. On the restoring movement, the slight excess movement of the racks to the right causes the detent members 142 to be rocked counterclockwise beyond their normal position as in Fig. 8 and thereby they push down the stops 144 to their normal position of Fig. 6. Upon the release of the restoring mechanism, the springs 137 draw the racks 135 slightly to the left until the detent members 142 strike the lugs 140a.

Provision is also made for restoring latches 140. It will be noted in Figs. 6 and 7 that each of the latches 140 is provided with a pair of notches 140b engaged by detent springs 157 secured to the bar 32 whereby the latches are held either in their normal or inset positions. The tails of the latches 140 are formed with hooked portions 140c which engage a storing plate 158 disposed between the plates 131 which guide the pins 130. The plate 158 is provided with a hole for each of the pins 130 and is located beneath the enlarged portions 130a of the pins whereby, if the plate 158 is raised, it not only lifts the pins 130 up to their normal position, but also, through the hook portions 130c, rocks all of the released latches 140 in a counterclockwise direction back to normal position.

When the plate 158 is operated as aforesaid, the shaft 154 and stop plate 153 are rocked in a counterclockwise direction to depress the latch springs 155 and release the cam members 150. For this purpose the shaft 154 is provided with an arm 159 which is connected by a link 160 (Figs. 6, 7, 19 and 20) to a bracket 161 secured to the plate 158 whereby the raising of the plate to restore the pins and the latches also rocks the shaft 154 counterclockwise in Fig. 6.

*Indicator mechanism*

Indicator mechanism is provided for the purpose of enabling the operator to proof-read each line and determine the amount of justification required prior to typing the line. This indicating mechanism is shown in Figs. 1, 2, 4, 5, and 9, and is most clearly shown in Fig. 9. Rotatably mounted on a cross shaft 170 supported by the frames 31 is a series of indicator wheels 171, one for each rack 135. The indicator wheels have two series of characters, one interspersed with the other, one series consisting of the lower case characters and the other the upper case characters. For the purpose of reading a line of characters, the cabinet 40 is provided with a viewing slot 40a.

For the purpose of indicating the wheel which is to be set at any given time, the pin carriage 80 has secured to it a pointer 172 (Figs. 1, 2, 5, and 9) which extends through a second slot 40b in cabinet 40 disposed parallel with the slot 40a, whereby, when the pin carriage 80 is set to cooperate with the row of pins 130 of any particular rack, the indicator 172 will be in alignment with the indicator wheel 171 which is geared to the rack corresponding to the selected row of pins 130.

For the purpose of driving the indicator wheels 171, the racks 135 are provided with teeth 135b meshing with an idler gear 173 which meshes with gears 174 secured to the indicator wheels 171. The idler gears 173 are loosely mounted on a cross shaft 175. Thus, the indicator wheels 171 normally will be set proportionately to the movement of the racks 135 to display lower case characters at the slot or window 140, and, when stopped in any of the intermediate positions, the proper upper case characters will be displayed.

Translating mechanism

After all of the racks have been set and the operator has proof read the line and determined the proper amount of justification, printing is effected. For the purpose of controlling the printing mechanism, there is provided translating means arranged to successively sense the positions of racks 135 and close circuits selectively to printing magnets according to the positions of the racks as determined by the set pins 130. This translating mechanism includes contact means individual to each rack. This contact means is shown in Figs. 5, 9, 10, and 11, and it appears to best advantage in Figs. 10 and 11.

Secured to the rear or left hand ends (Figs. 5, 9, and 10) of the racks 135 are the plates 180 formed of insulating material. Secured to the left hand ends of the plates 180 (Figs. 10 and 11) are the contact elements 181 which project upwardly slightly above the upper horizontal edges of the plates 180, the contact elements 181 being riveted to the plate 180 with a strip of insulating material 182 on the opposite side thereof to the plates 180. Each contact element 181 has integral therewith a narrow strip which is looped, as shown in Fig. 10, to form a contact shoe 181a, the end of the loop being riveted at 180b to the plate 180 whereby the contact element 181 and the shoe 181a are insulated from the end of the rack 135. The contact element 181 and the loop 181a are preferably formed of highly resilient material such as phosphor bronze, to enable the loop 181a yieldingly to engage contact plate 183. The plate 183 is secured insulatably to bar 34 and to a bar 184 of insulating material mounted between the plates 37.

The plate 183 is not level but a major part slants toward the front of the machine (Fig. 5) so that the loops 181a will be compressed slightly as the racks 135 move toward the rear of the machine, that is, to the left in Fig. 5. The purpose of this construction is to retard the racks since they are free to move under spring tension alone when they are released from latches 140 and would acquire too great momentum unless means is provided to check them.

In order to prevent the spring tension of the loops 181a from thrusting the rear or left hand ends of the racks 135 upwardly when the racks have moved a considerable distance toward the rear of the machine, there is provided guide means which consists of thin bars or guide strips 185 (Figs. 4, 5, 9, 10 and 11) which at their rear ends are received in transverse slots in the bar 35. The rear ends of the bars 135 are supported in said slots by means of a channel strip 186 (Figs. 4 and 5) secured to the rear face of bar 35. The rear ends of the guide bars 185 are bent at right angles to prevent their being pulled horizontally out of the slots in bar 35.

At their front or right hand ends, the strips 185 are somewhat L-shaped (Figs. 5 and 9) to provide arms 185a which extend downwardly into vertical transverse slots in the right hand or front edge of the bar 34. The bar 34 is also slotted longitudinally along its front edge to receive a retaining wire 187 which passes through holes in the vertical portions or arms 185a of the guide strips 185.

Each of the racks 135 is provided at its rear or left hand end (Figs. 9, 10 and 11) with a roller 135c which engages the lower edge of the adjacent guide strip 185. This roller prevents the rear ends of the racks from being thrust upwardly by the resiliency of the loops 181a. The insulating strips 182 prevent the guide strips 185 from making electrical contact with the contacts 181.

Cooperating with contact elements 181 is a sensing carriage which senses the relative displacements of the racks one by one and selectively controls printing of the characters represented by their positions. This sensing mechanism includes a carriage which is movable transversely of the racks 135 and parallel with the pin setting carriage 80 and is shown in Figs. 3, 5, and 9. This carriage includes a plate 190 having secured at its front and rear ends the angle strips 190a, 190b to which are secured the tubes 190c which may be welded or brazed to the inside of the angle and through which the rods 38 pass to slidably support the carriage 190. Pivotally mounted on lugs 190d is the lever 191 having one of its arms formed as a half nut 191a capable of engaging a worm 192 rotatably mounted in the plates 31. The worm 192 rotates continuously in the direction of the arrow (Fig. 9) and, if half nut 191a is held engaged therewith, as in Fig. 9, the plate 190 will be advanced to the right (Fig. 3) with a continuous motion.

Normally the lever 191 is held in the position of Fig. 5, with the half nut 191a disengaged from the worm 192, by means of a bar 193 secured to a shaft 194 journaled in plates 37. The bar 193 engages the rounded end of the other arm 191b of the lever 191 holding said lever against the tension of a leaf spring 195 which tends to rock the lever 191 counterclockwise (Fig. 3). When the shaft 194 is rocked clockwise, the spring 195 rocks the lever 191 counterclockwise and allows the half nut 191a to engage the worm 192.

Secured to the shaft 194 (Figs. 5 and 9) is a lever 196 urged in a clockwise direction by a spring 197 anchored to a pin carried by the right hand plate 37. Clockwise rotation of the lever 196, however, normally is prevented by a latch lever 198, one arm of which engages the upper arm of lever 196 as shown in Fig. 5. The latch lever 198 is pivoted at 199 to the right side plate 37 and is urged in a counterclockwise direction by a spring 200. The other arm of the latch lever 198 is connected by a link 201 to the plunger of the printing release solenoid RS. When the solenoid RS is energized, the latch 198 is rocked clockwise, thereby releasing the lever 196 permitting the shaft 194 and lever 196 to rock clockwise to the position of Fig. 9. This is caused to take place to begin a printing operation by a depression of the printing key 64, as will be made clear hereinafter.

The lower end of the lever 196 (Figs. 5 and 9) is connected by a link 202 to an arm 203 loose on a shaft 204 journaled in the plates 31. Secured to the shaft 204 is a clamping bar 205 which is faced with a pad 206 of resilient material such as rubber. When lever 196 rocks as aforesaid, in consequence of release of latch 198, the shaft 204 and the plate 205 are rocked in a clockwise direction to the position of Fig. 9 whereby the pad 206 engages the teeth 135b of the racks 135 and holds them securely against longitudinal displacement, the spring 197 maintaining pad 206 in yielding engagement with the racks. In order to restore the parts just described to the position of Fig. 5, there is provided a restoring solenoid RS1, the plunger of which is connected to the arm 203, whereby the energization of the solenoid rocks arm 203 and shaft 204 counterclockwise (Fig. 9) and thereby similarly rocks lever 106 and shaft 194 through link 202. This causes the lever 191 to be rocked clockwise, disengaging the half nut 191a from the worm 192.

The energization of the solenoid RS1 takes place automatically at the end of a printing operation as will be explained hereinafter.

The carriage 190 supports a set of sensing elements or contacts which are connected to the printing magnets and to the platen shifting magnets. The reference numeral 210 (Figs. 5, 10 to 14, and 16) designates an elongated bar of insulating material in which is molded a row of contact elements 211 best shown in Figs. 10 and 11, corresponding to the number of character keys 50. These elements 211 are bent at an angle to form wipers 211a designed to cooperate with the contact elements 181. Also molded in the bar 210 is a pair of contact strips 212, 213 having wiper elements 212a and 213a, respectively arranged in longitudinal alignment on the side of the bar 210 which is leading when the carriage 190 is being driven by the worm 192. In other words, with reference to Figs. 11, 12 and 14, the direction of feed by the worm 192 is to the left whereby any one of the wiper elements 212a or 213a may engage the contact elements 181 in advance of the elements 211a.

The relation of the contact elements 213a, 212a, to elements 211a is most clearly shown in Fig. 15, from which it will be noted that there is an element 212a for every other element 211a in approximately ⅔ of the length of the bar 210, corresponding to the first twenty-eight upper case character representing positions of the racks as defined by the corresponding contact elements 181. In the case of the elements 213a, there is one for each of the last 28 positions of a rack 135, including both the upper and lower case positions.

The bar 210 is provided with an extra contact element 211b in longitudinal alignment with the elements 211a and each of the elements 211b normally is in contact with the element 181 of the corresponding rack when the latter is in unset condition. As soon as a rack is set, as explained above, however, the element 181 moves out of contact with the element 211b and into contact with one of the elements 211a. As will be made clear hereinafter, the elements 211b cause automatic spacing in the event that a rack is not set to represent a character.

The bar 210 is mounted for vertical movement on the carriage 190 in the manner shown in Figs. 12 and 13. The plate comprising the main part carriage 190 is bent downwardly at right angles at its ends and is provided with diagonal slots 190e through which pass shouldered screws 190f threaded into holes in the ends of the bar 210. The ends of the bar 210 are provided with horizontal rectangular slots 210a in each of which is located a spring 214 engaging the ends of the slots and lugs 190g bent at right angles to the flanges in the plate 190 and projecting into the slots 210a. The springs 214 press the lugs against the right hand ends of the slots in Figs. 12 and 13. The springs 214 are purposely made strong enough so that normally the bar 210 and carriage 190 will travel virtually as a unit with no relative movement between the frame and the bar.

Owing to the inclination of the slots 190e, if the bar 210 is pressed to the right (Fig. 12), the studs 190f will ride up the slots 190e and lift the contact elements 211a, 211b, 212a, 213a out of engagement with the contact elements 181 to permit the carriage 190 to be returned after a printing operation without damaging the aforesaid contact elements. In traveling to the right in Fig. 3, or to the left in Fig. 11, the contact elements 212a, 213a first engage the elements 181 and then the elements 211a engage before the contact elements 212a, 213a become disengaged. Thus, momentarily one of the elements 211a, and possibly one or the other of the elements 212a, 213a will make electrical contact one after the other.

Mounted between the plates 37 and extending parallel with the line of travel of the carriage 190 (Figs. 5, 9, 26, and 27) is a bar 220. This bar supports at spaced intervals the fixed contacts 221 which are spaced at the same intervals as the racks 135. Mounted between the contacts 221 are the movable contacts 222 having the enlarged portions 222a arranged to be engageable with contact points 221a on fixed contacts 221 when the element 222 is pushed upwardly (Fig. 27). The elements 222 are bent at 222b to act as cam followers in cooperation with the top edges of plates 180. When the racks 135 are in their normal positions, that is, have not been set to represent a character, the plates 180 engage the bent portions 222b as shown in Fig. 9 and make electrical contact between the contact elements 221 on each side of the elements 222. In other words, assuming none of the racks have been set, but that all are in the positions of Fig. 5, all of the elements 221 will be electrically connected together across the machine. However, if any rack is set to represent a character, the element 222 corresponding to such rack will move to the position of Fig. 27, thereby breaking the circuit to the elements 221 on each side of the rack.

The bar 220 also is provided with a common contact strip 223 (Figs. 26 and 27) which extends lengthwise of the bar. Secured to the front or right hand end of the bar 210 is a contact member 224 which is formed with two contact elements, one bearing on the common bar 223 and the other riding on up-turned lugs 221b formed in the members 221. The contact element 224 is so positioned on the bar 210 that when one of the elements 211a engages an element 181, a current connection will be established between the common bar 223 and the contact element 221 located immediately to the left, from the operator's viewpoint, of the element 222 of the corresponding rack. In other words, if a particular rack has been set to represent a character so that the element 222 for such rack takes the position of Fig. 27, an open circuit will exist from the common bar 223 through the contact elements 224 through the two elements 221 on each side of the element 222. In Fig. 26, the elements 221, 222 are viewed from the bottom whereby, if the middle element 222 is in the position of Fig. 27 by reason of the corresponding rack 135 having been set to represent a character, the contact element 224 will move to engage lug 221b the next aforesaid element 221 above in Fig. 26 when the carriage 190 is spaced to bring the row of elements 211 in alignment with the element 181 on the rack for the middle element 222. The purpose of this arrangement is to enable the automatic restoration of the parts involved in printing, such as the carriage 190 and the printing carriage to be later described, when the last set contact element 181 is sensed.

Printing mechanism

Printing is effected by means of the type bars 230 (Figs. 4 and 5) which are pivotally mounted in the segment 231 in a well known way by means of a pivot wire 232. The segment 231 is supported on side frame plates 233 rigidly joined together by a rear bar 234 and a frame 235 which is curved and provided with a resilient type bar rest 236. The frame, including the side plates 233, comprises a carriage which is slidably mounted on the cross rods 39 by means of bushings 237 which may be welded or otherwise secured to the segment 231 and to the frame 235. The rear bar 234 is provided with a roller 238 which rides on the top horizontal edge of the rear angle 190b of the carriage 190. The rear bar 234 is transversely slotted and is provided with a pivot wire 239 which supports sub-levers 240 that are connected by links 241 to the typebars 230.

Secured to the top edge of the bar 234 is a comb plate 242 (Figs. 3 and 5) of which the prongs of the comb are bent downwardly to serve as anchors for springs 243 connected to the sub-levers 240 and urging them in a counterclockwise direction against a stop rod 244 supported by the plates 233. Pivoted to the sub-levers 240 are the actuating members 245 which are urged in a clockwise direction by springs 246, that hold the actuating members 245 against a stop bar 247 secured to the side plates 233. A similar bar 248 (see Fig. 16 also) is secured on the opposite side of the members 245 to the stop bar 247 and is spaced from said members to permit them to be rocked into engagement with the actuator 249 which is rotatably mounted in the frame plates 233. The members 245 are drawn into engagement with the actuator 249 by means of printing magnets PM secured to the front face of rear plate 234. When so drawn, the members 245 are pushed downwardly by the actuator 249 thereby operating the type bars through the links 241. The members 245 are formed with cams 245a (Figs. 5 and 16) adjacent their ends which are operative, when the members are thrust downwardly, to engage the bar 248 and cam the members out of engagement with the actuator to permit the restoration of the type bars and sub-levers 240 by the springs 243.

For the purpose of letter spacing the printing carriage 233 to the right in Fig. 3, there is provided on bushing 88 a spring motor 260, similar to the spring motor 87, which is connected to the right hand carriage side plate 233 by a tape 261 which passes around a pulley 90a mounted on a bracket 91a carried by the right side frame 37 and under a pulley 92a loose on the shaft 194.

Variable escapement mechanism is provided for controlling the feed of the carriage to the right in Fig. 3 for the spacing of the printed characters. This spacing mechanism 263 (Fig. 5) is mounted on a bar 264 carried by plates 233 and is constructed similarly to the spacing mechanism shown in Fig. 29 for the pin setting carriage 80. It differs from the latter mechanism, however, in that, instead of having the escapement dogs cooperate with a single rack, there is provided a rotary rack member 265 (Figs. 5 and 21) rotatably mounted in the frame plates 37, the plates 233 being suitably cut away to accommodate the member 265.

The rack member 265 is provided with nine sets of teeth. One of these sets is designated 265a in Fig. 21, and is the set with which the escapement mechanism 263 (Fig. 5) cooperates in that view. The set 265a is uniform in spacing, and in a machine equipped with pica type, will be spaced at intervals of $\frac{1}{10}$ of an inch. The remaining eight rack sections or sets of teeth are the same in spacing as the set 265a in the zones 265b at the ends of the member 265, each zone 265b comprising one-fourth of the length of the toothed portions of a member 265. The middle zone 265c of the remaining eight rack sections varies in the number of teeth and spacing of the teeth. For example, the set 265d has one less tooth space than the set 265a, but the spacing is slightly increased in comparison with the corresponding portion of the set 265a, whereby, for the same number of letter spaces permitted by the set 265a in the middle zone 265c, the carriage 233 will be permitted to move one extra tooth space into the zone 265b at the left. In other words, a line that has, say 70 characters or spaces and is seven inches long when the set 265a is used, will occupy one more letter space and be $\frac{1}{10}$ of an inch longer when the set 265d is used. The set 265d is the next in order in a counterclockwise direction, with reference to Fig. 5. The second set in a counterclockwise direction (Fig. 5) is the set 265e in Fig. 21 which has two less tooth spaces and a corresponding increase in spacing in the zone 265c whereby the same line mentioned above would be expanded to 7.2" or two spaces over seven inches. Similarly, the third and fourth rows of teeth in a counterclockwise direction (Fig. 5) are arranged to expand the line by three and four letter spaces, respectively.

The first two of the remaining four sets of rack teeth are designated 265f, 265g in Fig. 21 and have one and two more tooth spaces, respectively, than set 265a in the zone 265c, whereby a line which is seven inches long and comprises 70 letter spaces when typed with the central section 265a, will be compressed to a length of 6.9 and 6.8 inches, respectively, when typed with the racks 265f, 265g. Similarly, the remaining two racks in a counterclockwise direction (Fig. 5) have three and four teeth more in the zone 265c than the set 265a so as to compress a seven inch line to 6.7" and 6.6", respectively.

Summarizing, the rack member 265 may be selectively turned counterclockwise in Fig. 5 to enable any line which is longer than and includes the zone 265c (Fig. 21) in the working portion of the rack section selected for use to be expanded from one to four letter spaces, and, when selectively rotated clockwise, enables the line to be shortened by the same number of spaces.

The member 265 has secured to it a gear 266 (Fig. 16) which meshes with a gear sector 267 pivoted at 268 to the right hand frame 37. This sector 267 is connected by a link 269 to a justification control lever 270 pivoted on a bracket 270a (Fig. 3) secured to the right hand side of the hand plate 31.

The cabinet 40 (Fig. 2) is provided with a justification scale 40c in which the numbers refer to the number of letter spaces. When the lever 270 is set in the middle position (Fig. 2) designated "Normal," the set of teeth 265a on the member 265, which is uniform in spacing throughout the length of the member 265, is selected.

Figure 2:
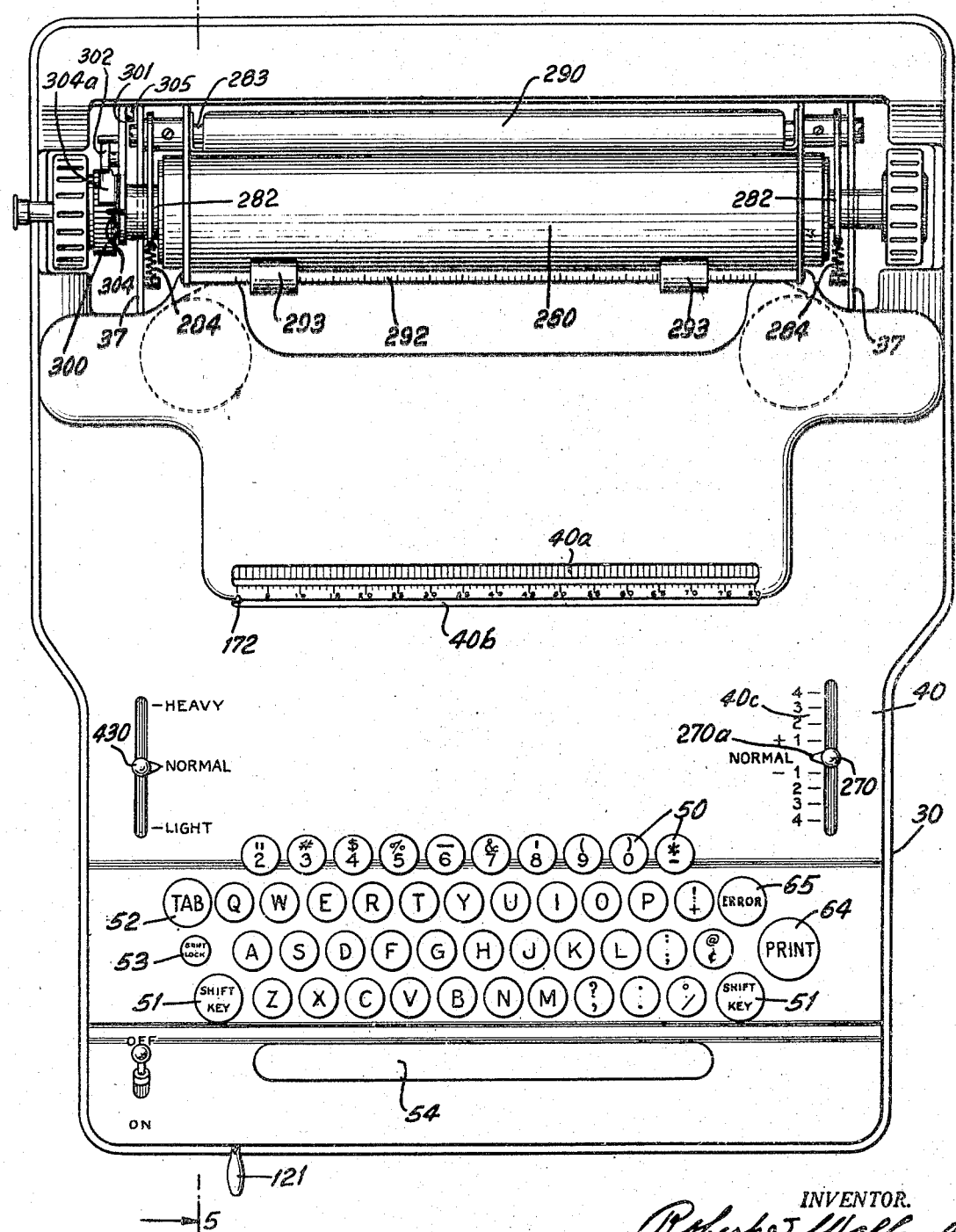
Fig. 2 is a plan view.

When the member 270 is moved downwardly in Fig. 2, the member 265 is rotated counterclockwise in Figs. 5 and 16 to select racks which decrease the spacing. When lever 270 is moved upwardly, the opposite is true and the member 265 is rotated clockwise to select the rack sections which increase the spacing.

The escapement mechanism 263 is operated by a bail 271 (Figs. 5 and 16) pivoted on the rod 239 and engaging the pivoted plate which supports the loose dog of the escapement. This bail extends underneath all of the sublevers 240 whereby the bail and consequently the escapement 263 will be operated whenever a type bar 230 is operated. The bail 271 is restored by a spring like 243. The type bars 230 are actuated through an arc of approximately 90° to the printing point to which the heads of the type bars are guided by the type guide 272 (Fig. 4) secured to a segment 231.

For the purpose of yieldingly holding the rack member 265 in many of its set positions, there is provided an aligning arm 273 (Fig. 16) pivoted at 274 to the right hand frame plate 37. The arm 273 is urged in a counterclockwise direction by a spring 275. The free end of the arm 273 is provided with a roller engaging in one of the tooth spaces of an aligning disk 276 (see Fig. 21 also) secured to the member 265. There are as many teeth in aligning disk 276 as there are rack sections on the member 265.

The work sheet is supported and line spaced by the usual platen 280 (Figs. 1, 2, 4, 5, and 6) fixed on the platen shaft 281. The latter is rotatable in the arms 282 which are secured to a cross shaft 283 journaled in curved extensions of the plates 37. Springs 284 anchored to the arms 282 and to pins guided by the plates 37 hold the arms 282 and hence the platen in a normal middle position from which the platen may be shifted in either direction. For this purpose, one of the arms 282 is provided with a downward extension 282a (Fig. 5) received in a slot 285a in a solenoid plunger 285. The plunger 285 is connected to two opposed solenoids PLS and PRS. In order to assist in holding the solenoid plunger 285 and the platen in the middle position, there is provided a detent lever 286 pivoted at 287 to the plate 37. This lever is actuated in a clockwise direction by a spring 288 and is provided with a roller normally engaging a notch in the plunger 285. The coils of the solenoids PLS, PRS are supported by brackets 289 attached to the plate 37. When the platen raising solenoid PRS is energized, the plunger 285 is drawn to the right (Fig. 5) thereby rocking the arms 282 and shaft 283 counterclockwise to lift the platen. Conversely, when the coil PLS is energized, the plunger 285 moves to the left to lower the platen.

Loosely mounted on the shaft 283 is a paper deflector 290 having the pressure rollers 291 which press the paper against the platen. Also loosely mounted on the shaft 283 is a paper bail 292 having the usual rollers 293 adjustable thereon. The paper bail is held in engagement with the paper by leaf springs 294 which engage extensions of the arms of the paper bail and tend to rock the paper bail in a clockwise direction (Fig. 5).

For the purpose of line spacing the platen, there is provided a line spacing ratchet 300 coupled to the platen (Figs. 1, 2, 4, and 16). Loosely mounted on the platen shaft is an arm 301 carrying the line space pawl 302 (Fig. 16) which is urged in a clockwise direction by a spring 303 connected to the tail of the pawl in a pin on the arm 301. Loosely pivoted on the platen shaft 281 is the manual control lever 304 provided with a shroud 304a which normally holds the pawl 302 out of engagement with the teeth of latch 300. By rotating the lever 304 variable extents so as to regulate the point at which the pawl 302 engages the ratchet 300, the amount of line spacing may be controlled in a well known way. The arm 301 is connected by a link 305 with a three-arm lever 306 (Fig. 4) pivoted at 308 to the framework of the machine. The other two arms of the lever 305 are provided with rollers 309. When the printing carriage 233 is fully returned, an extension 233a the right hand side plate 233 will lie between the rollers 309. As the printing carriage spaces to the right in Figs. 3 and 4, the plate 233 will engage the right hand roller 309 and gradually rock the lever 306 counterclockwise thereby thrusting the link 305 upwardly in Figs. 4 and 16. This causes the arm 303 to be rotated in a clockwise direction (Fig. 16) causing the pawl 302 to move idly over the teeth of the latch 300 and the shroud 304a. When the printing carriage is returned at the end of the printing of a line the extension 233a of left hand side plate 233 engages the left hand roller 309 and rocks the lever 306 clockwise in Fig. 4 thereby drawing down link 305 and rotating the platen one or more line spaces according to the setting of the lever 304.

*Restoring mechanisms*

Means is provided to return the pin setting carriage 80 and the printing unit or carriage 233. This means is driven by power and includes a pair of pulleys or reels 320, 321 rotatable on a bearing bushing 322 secured to the left hand frame plate 31 in Fig. 3. The pulley 320 has wound on it a tape 323 (Figs. 3 and 16) which passes over a pulley 324 loose on the rear rod 33 and thence around a pulley 325 on a bracket 326 carried by the left side frame 31 and is connected to the outside of the left hand flange 80a of the pin setting carriage 80. A similar tape 327 is wound around the pulley 321, passes underneath a pulley 328 on a stud 329, and thence around a pulley 330 on a bracket 331 to the left hand side of the sensing carriage 190.

As most clearly shown in Fig. 17, the pulleys 320, 321 are located on opposite sides of a gear 332 which is loose on the bushing 322 between a loose collar 333 and a collar 334 secured to the reduced portion of the bushing 322. The loose collar 333 abuts against a shoulder in the bushing and the pulley 321 is loose on the largest diameter of the bushing. The pulleys 320, 321 are provided with a row of equally spaced recesses in which are secured the plugs or pads 335, the faces of which confront the faces of the gear 332. The pulleys 320, 321 are formed with annular recesses 320a, 321a grooved to act as races for the balls 336 and to loosely receive the thrust plates 337 which are grooved to act as races for the balls 336. The shaft 175 which supports the idler gears 173 of the indicator mechanism is journaled by the bushing 322, the shaft being reduced in diameter and a collar 338 is provided to keep the pulley 321 from sliding along the shaft 175. Each of the pulleys 320, 321 is provided with a flange 320b, 321b which acts as a housing for a spiral flat spring 339, the inner ends of which springs are secured to the bushing 322 and the outer ends to the flanges 320b, 321b. These springs tend to rotate the pulleys 320, 321 to wind the tapes 323, 327 on the pulleys but are purposely made relatively weak so as to merely keep the tapes 323, 327 under sufficient tension to prevent their becoming fouled on the pulleys 324, 325, 328 and 330. In the case of the spring 339 for the pulley 321, its tension is considerably less than the tension of the springs 214 (Figs. 12 and 13) which maintain bar 210 in the position there shown. The tension maintained in the tapes 323, 327 by springs 339 is much less than spring motors 87, 260. The gear 332 meshes with a large gear 340 (Figs. 3 and 16) rotatable on the stud 329 and the gear 340 is secured to a smaller gear 341 which, in turn, meshes with a large idler gear 340a. The gear 340a meshes with an idler gear 342 which meshes with a gear 343 secured to the shaft of worm 192. On the right hand side of the machine, the work shaft has secured to it the gear 344 which meshes with a large gear 345, meshing with a gear 345a secured to the actuator 249. The gear 345a meshes with a gear 346 driven by a suitable motor not shown, which runs continually while the machine is in use.

Associated with each of the pulleys 320, 321 is a shifter fork 350 (Figs. 3 and 17) which is pivoted on a bracket 351 (Fig. 16) secured to the bar 34. The shifter fork for the pulley 320 is actuated by a pin carriage return magnet PCRM while the shifter fork for the pulley 321 is actuated by the printing unit return magnet PURM. When the magnets PCRM are energized, the fork 350 thrusts the pulley 320 to the left in Fig. 17 to engage the elements 335 with the right hand face of the gear 332 and in consequence of the fact that the gear 332 is driven continually by the train of gearing described above, the pulley 321 will be driven in a clockwise direction (Fig. 16) to wind the tape 323 and thereby draw the pin setting carriage 80 to the left in Fig. 3. Similarly, when the magnet PURM is energized, the pulley 321 will be thrust to the right and driven by the gear 322 in a clockwise direction to draw the sensing carriage 190 to the left.

Movement of the carriage 190 is communicated to the carriage 233a by means shown in Figs. 5, 13, and 14. The bar 264 secured between the plates 233 of the printing unit is provided with a tooth 264a with which cooperates a tooth 361a on a block 361 secured to the top of the bar 210. When tension is applied to the tape 327 in consequence of its becoming wound on the pulley 321 through the engagement of the clutch described above, bar 210 will be drawn to the left (Fig. 3) or to the right (Fig. 14), the springs 214 will be compressed, and the bar 210 will move diagonally upwardly and to the right in Fig. 12, the studs 190f traveling the length of the diagonal slots 190e. This not only has the effect of lifting the elements 211, 211a, 212a and 213a clear of the contacts 181, but also brings the tooth 361a on block 361 into engagement with the tooth 264a of bar 264, thereby causing the printing carriage to be returned with the sensing carriage 190.

The printing carriage 233 becomes displaced relative to the sensing carriage 190 by an amount varying from one to four letter spaces at the end of a line, depending upon the amount of justification required. Before commencing to print a new line, the carriages 190 and 233 should be aligned with each other to insure that the first character will be printed in the proper position on the work sheet and not displaced to one side or the other from one to four letter spaces. In Fig. 25, there is shown means for effecting alignment of the two carriages. Fig. 25 shows the relation of the teeth 264a, 361a when the printing unit carriage 233 is in a position to print in the first letter space of a line and the sensing carriage 190 is about to sense the position of the element 181 for the first rack.

In Fig. 25, the bar 210 is shown in retracted position to which it is returned by the springs 214 upon the disengagement of the clutch controlled by the magnet PURM. In this position, the ends of the bar 210 are held by two detent pawls like 362 which are provided with V-shaped notches 362a engaging triangular teeth in members 363 secured to the ends of bar 210. The detent pawls 362 are pivotally mounted at 364a on the arms 364 which are secured to a shaft 365 journaled in a bracket 366 secured to the base 30. The pawls 362 are urged in a clockwise direction (Fig. 25) by springs 367 and are formed with stop lugs 362b engaging the edges of the arms 364 to limit clockwise rotation of the pawls. The arms 364 are urged in a counterclockwise direction by a spring 368 coiled around the shaft 365 and engaging one of the arms 364 and the bracket 366. One of the arms 364 is provided with an extension 364b having an adjustable stop screw 369 engaging the base 30 to limit counterclockwise movement of the arms 364 and to define thereby the starting position of the bar 210 and hence the carriage 190. Clockwise rotation of arms 364 is limited by a stop screw 369a on the extension 364c of arm 364.

The lug 264a with the parts in normal starting position (Fig. 25) is located at least a little more than five letter spaces distance from the lug 361a, thus enabling the carriage 233 and consequently, the lug 264a to move relative to the carriage 190 the extent involved in justifying a line which is four units short of the desired length. This insures that no matter how much justification is required, the lug 264a will never be likely to move to the left (Fig. 25) past the lug 361a and get into a position to the left of the latter. If this happened, it would prevent returning the printing unit carriage 233 to starting position. The necessity for providing for the over-travel of the lug 264a makes it unsafe to depend upon the mere engagement between the lugs 264a and 361a to align both carriages 190, 233 in starting position.

Let it be assumed that no justification is required in typing a given line. In such a case, there will be no displacement of the printing carriage 233 relative to the sensing carriage 190 and the lug 264a will remain about five letter spaces distant from the lug 361a during the typing of the line. If, on the other hand, a line is short and must be expanded, say four letter spaces, to make it conform to the desired standard of line length, the lug 264a will gradually approach the lug 361a during the typing of the line until at the end of the line, the lug 264a will occupy a position a little more than one letter space from the lug 361a. Under a third limiting condition, a line may be four spaces over the desired length and must be shortened in which case, the lug 264a will travel a lesser distance than the lug 361a and at the end of the line the two will be nine letter spaces apart.

It will be seen, therefore, that when both carriages are returned, the lug 361a will pick up the lug 264a in each of the above cases and, in the last two, if the carriage 190 were to be merely restored to a fixed starting position, the carriage 233 would be left in positions four letter spaces away from the desired right hand margin. The mechanism just described corrects this fault by allowing bar 210 and hence the carriage 190, to over-travel to the left in Fig. 3 or to the right in Fig. 25 slightly more than five letter spaces which results in carrying the loose dog of the escapement 263 which is the counter part of the dog 97 beyond the last tooth on the left hand end of the rack member 265 which would be the right hand end in Fig. 21.

When the bar 210 reaches its normal starting position when being returned, the pawls 362 snap over the teeth in the members 363 and the bar 210 engages the rollers on the ends of the arms 364 and thereafter rocks the arms clockwise until they are stopped by the engagement of the stop screw 369a with the base 30. Upon the disengagement of the carriage return clutch by the deenergization of the magnet PURM, the bar 210 is released permitting the arms 364 to thrust said bar back to the position of Fig. 25. The springs 214, assisted by gravity, allow the bar 210 to drop moving diagonally downwardly to the left to the position in Fig. 25 in which the elements 211a take a position a little to the right (Fig. 25) of the element 181 for the first rack to be sensed. The movement of the bar 210 just mentioned, also disengages the lug 364a from the lug 264a and permits the spring motor 260 to draw the printing carriage 233 five spaces to the right (Fig. 3) to the position of Fig. 25.

The pawls 362 yieldingly hold the bar 210 in contact with the roller 264 during the movement of the arms 364 to align the bar 210 with the carriage 233. For this reason, the springs 367 preferably are strong enough to prevent rebound of bar 210 but are not strong enough to prevent disengagement of the pawls 362 when the carriage 190 and bar 210 are fed positively to the right (Fig. 3) by the worm 192. The springs 214 must be strong enough to prevent the bar 210 from being displaced diagonally upwardly to the right in Fig. 25 when bar 210 starts its movement to the left in Fig. 25 or to the right in Fig. 3 to sense the contact elements 181.

For the purpose of restoring the racks 135, there is provided a cross bar 370 (Figs. 3, 5, 9, and 16) secured to short downward extensions 371a of two racks 371 which are guided for horizontal movement on rods 372 (see Fig. 4 also) supported by the bars 32 and 35. The racks 371 are slidably supported on the rods by means of bushings 371b secured to each end of each rack. Springs 373 anchored to the extensions 371a and to angle bar 138 hold the racks in a retracted position with extensions 371a acting as stops by engagement with front or left hand edge (Figs. 5 and 9) of the bar 34. The racks 371 mesh with gears 374 secured to the shaft 175. The bar 370 extends underneath all of the racks 135 and, when moved to the right in Figs. 5 and 9, will engage the parts of the racks to which the springs 137 are anchored and push the racks to the right far enough to enable the latches 140 to re-engage the detents 142 as in Fig. 6.

For the purpose of rotating the shaft 175 to move the racks as aforesaid, there is provided a clutch 375 (Fig. 3) operated by a magnet RRM and a shifter fork 376. The clutch 375 is constructed in the same general way as the clutch comprising the gear 332 and pulley 320 except that the counter part 377 of the pulley 320 is secured to a sleeve 378 integral with the hub of a gear 379 loose on the shaft 175 while the counter part of gear 332 is the gear 374. Thus, when the magnet RRM is energized, the clutch 375 will be engaged by pressing the member 377 against the gear 374 to thereby clutch the shaft 175 to the gear 379. The gear 379 (Fig. 3) is driven continuously through a train of gearing comprising a gear 380, secured to a smaller gear 381 rotatable on a stud carried by the right hand plate 37, an idler 380a meshing with gear 381 and a gear 382 secured to the shaft of worm 192 and meshing with gear 380a.

Near the end of its rightward stroke (Fig. 16) the cross rod 370 engages the lower end of a Y-shaped slide 383 vertically slidable on the right hand plate 31 and pushes said slide upwardly. The arms 383a of the slide engage the detents 71 of the error and printing keys 64, 65 (Fig. 18) and release whichever one happens to be held depressed at the time.

For the purpose of controlling the rack return clutch magnet RRM, there is provided contact means which maintains the clutch 374, 377 in energized condition until the racks have been fully restored. This contact mechanism is shown in Fig. 16 and is rendered operative by the solenoid RS, is actuated by solenoid RS1, and is rendered inoperative by the movement of the restoring racks 371. Insulatably mounted on the base 30 are the contacts C6, the upper member of which is engaged by an insulated pin on a three-armed lever 400 pivoted at 401 on a bracket 402 secured to the base 30. One of the arms of the lever 400 is formed with a bent-over lug 400a normally located to the right of a latch point 403a on a latch lever 403 pivoted at 404 on the bracket 402. A spring 405 urges the latch lever 403 in a counterclockwise direction against the lug 400a. The lever 403 is shaped to extend into the path of a lug 371c formed in the right hand rack 371. Pivoted at 406 on the link 202 is a hook shaped dog 407 which is urged in a clockwise direction by a spring 408 against a stop pin 409 on the link.

When the solenoid RS is energized to release the latch 198 to permit the arm 203 to move to the position of Fig. 9, the dog 407 is carried upwardly to the left (Fig. 16) enabling the dog 407 to snap over the third arm of the lever 400 as in Fig. 9. When the solenoid RS1 is energized upon the initiation of a restoring operation and draws the link 202 to the right, the lever 400 is rocked in a counterclockwise direction (Fig. 9) thereby closing the contacts C7 and causing the lug 400a to move to the other side of the latch point 403a and be held thereby. When restoring bar 370 has almost reached the end of its rightward travel (Fig. 5) to restore the racks 135, the lug 371c engages the right hand end of the latch lever 403 and rocks it clockwise to release the lever 400 which then is rocked in a clockwise direction in consequence of the spring tension of the upper contact member C6. This opens contacts C6.

Mechanism is provided for raising the plate 158 which restores the pins 130, and through the link 160, also restores the cam members 150 as described above. Loose on the shaft 204 (Fig. 19) are the levers 410 connected by links 411 to lugs 412a depending from a bar 412 formed at each end with a pivot 412b received in a hole in the adjacent frame plate 31. The levers 410 have their other arms 410a engaging the under face of the rear corners of the plate 158, while the front corners of this plate are provided with brackets 413 which extend over the right hand edge of the bar 412. When the right hand lever 410, the one shown in Figs. 16 and 19, is rocked clockwise, the rear corners of the plate 158 will be lifted by the arms 410a and at the same time the bar 412 will be rocked counterclockwise by link 411 to raise the front corners of the plate 158 through the medium of brackets 413. Bar 412 actuates the left hand lever 410 through its link 411.

For the purpose of operating the shaft levers 410 and bar 412, there is provided a pin restoring magnet PRM mounted on the block 414 secured to the right hand plate 31. Pivoted at 414a on the block 414 is an actuating lever 415 which extends downwardly and is connected by a spring 416 to the right hand lever 410. Pivoted at 415a on the arm 415 is an actuating member 417 shaped like the actuators 245 in Figs. 5 and 16 and urged in a counterclockwise direction (Fig. 16) by a spring 418, this spring holding the actuator 417 against a stop block 419 carried by a plate 420 secured to the block 414. The plate 420 is slotted vertically to guide the actuating member 417 and the plate is also provided with a bracket 421, one of the arms of which extends horizontally to cooperate with the cam surface 417a formed in the actuator 417.

When the magnet PRM is energized, the actuating member 417 is rocked in a counterclockwise direction (Fig. 16) to bring the end thereof into one of the tooth spaces of the ratchet 422, as in Fig. 19. Ratchet 422 is rotatable on the cross rod 170 and is driven in the direction of the arrow in Figs. 16 and 19 by the gear 379 and a gear 424 through an idler 423 secured to the ratchet (Fig. 16). When the actuating member 417 is engaged by the ratchet 422 as aforesaid, the actuating member will be thrust to the right in Fig. 16, thereby rocking arm 415 counterclockwise and, through the spring 416, rocking lever 410 in the same direction to raise the plate 158. This movement is effected against the tension of a restoring spring 425 connected to a plate carried by the bar 34 and to the lower end of the arm 415. Spring 425 normally holds member 417 in the position of Fig. 16 with a stop lug 417b on said member against block 419. In its progress to the right, the cam 417a ultimately comes into engagement with the horizontal arm of bracket 421 and cams the actuating member 417 out of engagement with the ratchet 422, permitting the spring 425 to restore the parts to the position of Fig. 16. Fig. 16 shows the actuating member 417 on the verge of disengagement from the ratchet 422.

*Operation*

It will be assumed that the copy to be typewritten is to have a uniform line length of 65 letter spaces, in other words, the right hand margin is to be 6½ inches from the left hand margin. With the pin setting carriage 80, the sensing carriage 190, and the printing carriage 233 in their left hand marginal positions (Fig. 3), the operator first depresses one of the shift keys 51 before or simultaneously with depression of the "W" key 50 thereby closing one pair of contacts SKC (Fig. 22) and prepares for closure a circuit to be established by relay R1 from line wire W1 through the shift solenoid SS, contacts SKC, and contacts R1a of relay R1 to line wire W2. The operator next depresses the "W" key 50 to commence writing the line shown in Fig. 23. The depression of the key 50 closes a circuit as follows: line wire W1, the contacts KC of the "W" key, the pin setting solenoid PS corresponding to the pin 130 which stops the first rack 135 in the "W" position, and the coil of relay R1 to line wire W2. The circuit for solenoid SS is thereby completed by contacts R1a.

The energization of the shift solenoid SS (Fig. 6) rocks clockwise the cam member 150 corresponding to the first rack 135 while the energization of the solenoid PS pushes down the 13th pin 130 from the right (Fig. 6) representing the lower case "w." The energization of the relay R1 also closes a circuit to the latch release solenoid LRS (Fig. 22) through the contacts R1b which has the effect of rocking clockwise the latch 140 holding the first rack 135 in its normal right hand position (Fig. 6). This permits the first rack 135 to move to the left and, during the first part of its movement, the cam member 150 pushes up the stop 144 and causes the first rack 135 to be stopped half way between two pins 130 in a position similar to the one shown at the left in Fig. 7. This stops the rack with contact 181 of the first rack in the upper case "W" position as shown in Fig. 15. The energization of the escapement solenoid ES is effected by the closure of the contacts R1c, thereby causing the pin setting carriage 80 to escape one space to bring the pins 85 into register with the row of pins 130 corresponding to the second rack.

The operator now depresses the "E" key 50, but this time does not depress a shift key 51 with the result that only the first pin 130 on the right (Fig. 6), corresponding to the lower case "e" is selected and pushed downwardly, the proper latch 140 and the escapement solenoid ES being operated as before. The operator next depresses the space bar 54 thereby closing the spacing contacts SC causing the escapement solenoid ES to be energized for a third time. The operator continues to depress the appropriate keys or the space bar until the entire line has been set up by pushing down pins 130 and setting the racks 135 to represent characters as determined by the depressed pins.

In "writing" this first line, as it may be termed for convenience, it just happens that the line fills 65 spaces and does not require justification, consequently, the operator next depresses the printing key 64 as far as it will go. This causes the contacts C1 to C3 to close.

Contacts C2 connect the printing release solenoid RS directly across the line wires W1, W2 (Fig. 22). The energization of the solenoid RS releases the latch 198 (Fig. 5) permitting the half nut 191a to engage worm 192 as in Fig. 9, thereby starting the sensing carriage 190 moving to the right in Fig. 3 carrying with it the sensing contact bar 210. Contacts C3 establish a circuit (Fig. 22) from line wire W1, contacts C3, contacts CRC, and magnet PCRM to line wire W2. This energizes the pin carriage return clutch magnet PCRM and the restoring of the pin setting carriage 80 to its left hand position in Fig. 3. Contacts C1 connect the pin restoring magnet PRM across the line wires W1, W2, thereby causing the mechanism shown in Fig. 19 to become operative as described, to restore the pins 130, and, through the link 160, to release the cam members 150 for the first, eighth, twenty-second and twenty-ninth racks.

The carriage 190 first moves the contact element 212a (Fig. 15) which now is in line with contact 181, for the first rack into contact with said element and thereby establishes a circuit to the platen lowering solenoid PLS as follows: line wire W1 (Fig. 22) the common contact plate 183, the resilient portion 181a and the contact member 181 on the first rack 135, the element 212a and platen lowering solenoid PLS, to line wire W2. The energization of the solenoid PLS (Fig. 5) causes the arms 202 to be rocked clockwise lowering the platen to select the upper case "W" for printing. Next, the "W" element 211a, which is in line with the element 181, will engage the latter and establish a branch circuit from the element 181 to the printing magnet PM controlling the printing of the letter "W" (see Fig. 15). This causes the "W" type bar 200 to be operated by the magnet PM as described above, and among other things, the bail 271 will be operated to actuate the escapement 203, it being assumed that the set of rack teeth 200a remains in cooperation with escapement 203. As a result the carriage 233 will escape a tenth of an inch, moving the element 211a corresponding to the lower case "e" into engagement with contact 181 of the second rack 135. In this case, only a simple circuit to the magnet PM, which prints the letter "e" will be established.

The typing mechanism is what is commonly termed in the art a double shift mechanism in which each type bar has three types of which the middle type normally prints and is in the lower case group. The capitals are printed by lowering the platen, consequently they are disposed on the end of the type head nearest the pivot wire 232. The bulk of the special signs, numerals and most of the punctuation marks are disposed at the outer ends of the type heads and are printed by raising the platen. Thus, in printing a semicolon, an element 211a will be effective to select platen raising solenoid PRS.

The third rack is in normal position in consequence of the fact that no pin 100 was selected, and the contact 211b engages the contact element 181 of this rack, establishing a circuit to the spacing magnet SM which causes an operation of the bail 271 to actuate the escapement 203. The remainder of the line is typed in the same general fashion as just described, producing the result shown in Fig. 28, in which the typed matter just fills the space allotted to the line.

Prior to pressing the printing key, the operator may proof read the line which is displayed through the slot or window 40a, to determine if there are any errors and to determine if the line is short or over the desired length.

After the machine has typed the first line, the operator may proceed to write the second line by manipulating character keys 50 and the space bar 54. At the end of this operation, the second line will be displayed in the window 40a, as shown in Fig. 28. It will be noted in this figure, that the second line, as written on the keyboard, is three units short of reaching the margin. Before pressing the printing key 64, the operator grasps the lever 270 and moves it up (Fig. 2) until the pointer portion 270a registers with the numeral 3 to enable the entire line to be expanded three units, that is, $\frac{3}{10}$ of an inch. This, of course, rotates the rack member 265 in a clockwise direction (Fig. 5) to select the third rack section in a counterclockwise direction (Fig. 5), designated 265e in Fig. 21, which causes the line to expand three units. Upon the depression of the printing key, the machine proceeds to automatically type the second line as shown in Fig. 24.

The operator next proceeds to write the third line which it will be noted in Fig. 24, is one unit too long requiring that the rack member 265 be rotated counterclockwise (Fig. 5) to select the rack section 265f (Fig. 21).

When the printing carriage 233 types the letter "t" at the end of the first line (Fig. 23), the wiper contact 224 moves on to the element 221 between the 65th and 66th racks 135 and, since none of the remaining racks to the right in Fig. 3, including the 66th, have been moved away from their normal positions, all of the contacts 221 to the right (Fig. 22) of the one engaged by the wiper 224 after typing the last character will be connected in series. This causes a circuit to be established from line wire W1, through the common strip 223, the wiper 224, and the remaining contact elements 221, 222 to the right, the magnets RS1, PURM, and RRM in parallel to line wire W2.

The energization of the magnet RS1 causes the arm 202 to be rocked counterclockwise (Fig. 9), thereby closing the contacts C6 as described above, which maintain the magnets PURM, RRM, and solenoid RS1 in energized condition until the racks 135 have been completely restored and the contacts C6 have been reopened by the projection 371a engaging and releasing the latch member 400. The energization of the magnet PURM causes the engagement of the clutch composed of gear 308 and the pulley 321 thereby restoring the printing unit carriage 233 and the sensing carriage 190 in one operation as described above. The energization of the magnet RRM engages the clutch 375—377 which causes the restoring bar 370 to move to the right in Fig. 5, to restore all of the set racks, the circuit to the clutch magnet RRM being broken when contacts C6 open, in consequence of the action of the lug 371a. It may be assumed that the drive gearing and size of pulley 321 are proportioned to enable the carriages 190, 233 to be fully restored before the bar 370 reaches the end of its rack restoring stroke.

It may happen on inspection of a line after it has been set up by operation of the keyboard discloses that an error has been made in writing the line. In order to correct the error, the operator may write the line over again on the keyboard without, however, typing it on the work sheet. This is accomplished by depressing the error key 61, thereby closing the contacts C4, C5.

The closure of the contacts C5 energizes pin carriage return magnet PCRM over a circuit from line wire W1, contacts C5, CRC, and magnets PCRM to line wire W2. The energization of magnet PCRM causes the pin carriage 80 to be returned through the engagement of the clutch 320—321, the point to which the carriage is returned being determined by the contacts CRC which are opened, as described above, when the projection 110b (Fig. 28) engages the left hand marginal step 110.

The closure of contacts C4 causes the magnets PURM, RRM, and solenoid RS1 to be energized to insure that the printing unit carriage 233 and the sensing carriage 190 are fully returned. The depression of the error key 65 also causes the contact C1 to be closed, thereby energizing the pin restoring magnet PRM which effects the restoration of the pins 130 which were set to represent the characters of the incorrectly written line.

The machine is provided with a main switch MS which may be closed to start the driving motor RM and for the purpose of controlling the intensity of the impressions made by the type bars 230, there is provided a rheostat R in series with the motor which is controlled by a lever 430 (Figs. 1, 2, and 16).

While there have been shown and described and pointed out the fundamental novel features of the invention as applied to a single embodiment it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, printing mechanism; character storage means for automatically controlling said printing mechanism, including a series of longitudinally movable rack members, one for each character and settable to different positions representing one case of characters, each rack member having detent means to arrest said rack member in its character representing positions and having a supplemental, normally inactive, detent carried by said rack member for arresting the latter in intermediate positions representing a different case; character keys; rows of stops, one row for each member and settable by said keys in the path of the first detent; a shift key, and means controlled by the shift key for moving said supplemental detent to an active position to arrest the rack members in said intermediate position by cooperation with the set stops.

2. In a machine of the class described, printing mechanism, character keys, a shift key; character storage means controlled by said keys including a series of racks movable to different character representing positions, including lower case character positions and upper case character positions interspersed with the lower case positions, each rack having a lower case detent thereon and a normally retracted upper case detent movable to a position to engage said lower case detent; rows of stops, one for each rack, and selectively movable to positions to be engaged by the lower case detents to position said racks in lower case character storage positions and also engageable by said upper case detents when the latter have been moved into engagement with the lower case detent to position the racks in upper case positions; means controlled by the character keys for selectively moving said stops, means controlled by the shift key for moving said upper case detents, means to move said racks to engage said detents with said stops, means to restore said racks, and means operative when said racks are restored to actuate the lower case detents to retracts the upper case detents.

3. In a machine of the class described, a rack movable to any one of a series of positions representing a case of characters, a series of stop members corresponding to said positions, each member movable from an inactive position to a position to stop said rack, releasable means to hold said rack in a position out of cooperation with said stop members; a pair of stop elements carried by said rack, one of said stop elements being engaged by said holding means and operative, when one of the stop members has been moved to rack stopping position and the holding means released, to engage said one stop and arrest said rack in a lower case character representing position, the other stop element being settable to a position between the first stop element and the moved stop member to arrest the rack in positions intermediate the first named positions and determining another case of characters, character keys, means controlled by said keys for moving said stop members, and releasing said holding means from the first stop element, a shift key, means controlled by the shift keys for setting the second stop element, and means for moving said rack member to engage the stop elements with the moved stop member.

4. In a machine of the class described, printing mechanism including a series of character selecting circuits, character keys, a device for storing a line of characters under control of said keys including a series of contact members each differentially selectively settable to a plurality of positions representing characters, a carriage having contact means cooperating with the contact members to selectively close said printing circuits one at a time according to the positions of the contact members, means to advance the carriage to engage the cooperating contact means and members one at a time thereby to close said printing circuits selectively and successively, means to restore said carriage and said contact members, and contact means controlled by both said contact members and by the position of said carriage for causing operation of the restoring means.

5. In a machine of the class described, a series of character keys, a series of racks each movable to different positions to represent the different characters corresponding to said keys; a bank of pins projectionable into the paths of movement of said racks, including a row of pins for each rack and corresponding to different stopping positions of the rack; a pin setting carriage traversible over said bank of pins and having a row of setting pins positionable in alignment with a single row of the first named pins at a time and controlled by said keys to project said first named pins selectively into the path of said racks; means operative, when a pin in any row is projected into the path of a rack, to move said rack until stopped by said projected pin; indicator mechanism for indicating a line represented by the positions of said racks, including an indicator member for each rack movable thereby to the different character representing positions of such rack, to display said characters; means to automatically traverse the pin setting carriage over said pin bank to successively select said first named rows of pins for projection, printing mechanism; and means to control the printing mechanism in accordance with the positions of said racks, including means to successively sense the positions of said racks and control the printing mechanism to cause the characters corresponding to the rack positions to be printed, and including means to render the rack sensing means operative.

6. In a typewriting machine, means to display a row of characters constituting a line including an indicator member for each character, means individual to each indicator member for variably moving said member to different positions to display different characters; a row of stop pins for each of said members and selectively projectionable to stop said members in different character displaying positions, each pin representing a character; a pin setting device cooperating with said pins and movable to select one row of pins at a time and including magnetic means for projecting said pins, a keyboard comprising keys representing the different stopping positions of said members, contact means actuated by said keys for closing circuits to said magnets, contact means movable with said members to positions to represent the characters corresponding to the various positions of said racks, printing means comprising a series of printing magnets for controlling the printing means, and sensing means including contacts movable to engage the contact means one at a time to selectively close circuits to the printing magnets to cause the characters represented by the positions of said contact means to be printed successively by the printing mechanism.

7. In a typewriting machine, a keyboard comprising character keys, a series of members movable to different positions to store representations of any of the characters corresponding to the keys to thereby store a line of matter to be subsequently printed, means controlled by the keys for positioning said members according to the keys operated, printing means for printing said characters one at a time including a double shift platen; means to control the printing means according to the positions of said members including sensing means, said sensing means having means to determine the case of a character to be printed from the position of the operated storage member denoting such character, and means controlled by the sensing means for shifting the platen from a normal position to a plurality of other positions according to the case of the character to be printed.

8. In a machine of the class described, character keys, means controlled by the character keys for storing a line of characters including a series of members each settable to a plurality of positions representing characters and having a position representing an automatic space, a spacing circuit including a spacing magnet, means to successively sense the positions of said members including a carriage, printing means controlled by the sensing means for printing the characters one at a time, and contact means controlled by said carriage and by said members when in automatic spaced position for closing said spacing circuit.

9. In a machine of the class described, double shift printing mechanism for successively printing characters one at a time including a plurality of shift circuits and including a plurality of printing circuits equal to the number of characters in a single case; character storage means including a series of storage members, each settable to a plurality of positions denoting several type cases of characters and having contact means set by such member to represent a character, and contact means cooperating with the first contact means to select both a printing circuit and one of the shift circuits according to the position of each of said members.

10. A typewriting machine comprising character keys, a shift key, character storage means including contact means variably positionable to represent the character corresponding to each key actuated in writing a line, means controlled by the character keys for positioning the contact means to represent lower case characters, means controlled by the shift key for effecting further positioning of the contact means to represent an upper case character; printing means including magnets for effecting printing of characters, each magnet controlling the printing of both a lower case character and an upper case character; circuits including said magnets and including contact means coacting with the first contact means to select said magnets according to the positions of the first contact means, case shift means, and shift contact means coacting with the first contact means in their case shifted positions to cause operation of the case shift means in addition to a selection of one of said magnets.

11. A typewriting machine having case shiftable printing mechanism, character keys, a shift key; means controlled by said keys for storing representations of the characters corresponding to the keys including the case shifted characters, and including elements variably settable under control of the character keys to represent any of the characters of one case and further settable under control of the shift key to represent the characters of the other case; and means controlled by said elements for operating the printing mechanism to print the characters represented by said elements, said printing mechanism operating means including a source of energy independent of the energy applied in the operation of the operated character keys.

12. In a machine of the class described: double shift printing mechanism including a plurality of type bars, each printing three characters, a pair of shift circuits, said type bars normally printing one of the characters and printing the others by selection of the shift circuits, said printing mechanism also including a series of printing circuits, one for each type bar; a series of characters keys; members settable under control of said keys to positions representative of all of the characters on the type bars, each of said members having a contact element movable by said member to any of said positions; and means to successively sense the setting of said members including contact means cooperating with the contact elements one at a time and operative to select one of the printing circuits and also select one of the shift circuits when a member by its position represents a case shifted character.

13. A typewriting machine comprising printing mechanism, including a series of type bars each having three type characters and case shifting means to select any one of the types on a type bar; character keys, a shift key, character storage means including character storing members variably positionable to represent any of the characters printed by said type bars including case shifted characters, means controlled by the keys including the shift key for variably positioning said members, and means controlled by the positions of said members for selecting said type bars and case shifting means for operation.

14. In a typewriting machine, printing mechanism including a series of type bars, character keys, a series of members settable to different positions to represent the different characters corresponding to said keys, means controlled by said keys for setting said members; and means controlled by said members for selecting said type bars for operation, including a sensing device including a carriage movable transversely of said members and having means to successively sense their positions and successively select the type bars for operation.

15. In a machine of the class described, case shiftable printing mechanism, including a plurality of printing members, each printing member carrying at least two cases of its character, and selectable case shift controlling means; character keys; character storage means including a series of storage members each settable to any one of a plurality of positions representative of all of the characters printed, a case shift key, means controlled by the shift key and character keys for setting said storage members to represent a line of characters, and means controlled by the positions of the storage members for selecting said printing members and the case shift controlling means, one printing member at a time, to print the characters of said line in succession.

16. A line composing machine comprising character keys, mechanism for printing a line of said characters, means controlled by said keys for storing the line to be printed including a series of storage members each variably settable to different positions representing said characters, indicator members driven by the first named members for indicating the line to be printed, means controlled by the keys for setting said storage members and indicator members, justifying means selectively operable to determine the length of the stored line as printed, means for controlling the printing mechanism according to the positions of the storage members to print the stored line and controlled by the justifying means, and means to initiate operation of the printing means under control of the storage means.

17. A composing machine comprising a line storing and indicating device having members variably positionable to indicate the composition and length of a complete line, printing means including variable spacing means, means to set the variable spacing means to cause a composed line to fit a predetermined line length when printed by the printing means, a keyboard including character keys and space keys, means controlled by said keys for variably positioning the members in said storing device to indicate a line as a preliminary to printing said line, means controlled by the storing device for operating the printing mechanism and spacing means to print the composed line, means to set the operating means in operation, and means to restore said members automatically after the last character of a line has been written.

18. A composing machine comprising means to store a line, including storage members variably settable to different positions to represent by their position different characters and spaces; indicator members actuated by the storage members to indicate stored lines; a keyboard including character, space, and shift keys; means controlled by said keys for variably setting said storage and indicator members to represent characters and spaces; means for printing said characters, variable spacing means for spacing the characters different extents; a justifying controller for setting the spacing means according to the extent a composed line fails to conform to a predetermined length as stored by the first means, means controlled by the positions of said storage members for controlling the operation of the printing means and spacing means to print and space the characters in the stored line, and means to initiate the printing operation after said controller has been set.

19. In a composing machine, a series of storage racks, each longitudinally movable to a plurality of stopping positions representing the characters in a single case and to positions interspersed with the first positions to represent the characters of a different case; stop members, one for each of the first positions and movable into positions to stop said racks in said first named character representing positions; case shift stop members movable to positions to stop said racks in said interpersed positions in cooperation with the first stop members, character keys, a case shift key, means controlled by the character keys for selectively moving the first named stops to rack stopping positions, and means controlled by the shift key for rendering the second stops effective.

20. A typewriting machine comprising character keys, a shift key, character storage means including contact making members variably positionable to represent the characters corresponding to each key actuated in writing a line, means controlled by the character keys for positioning the contact members to represent lower case characters, means controlled by the shift key for effecting further positioning of the contact members to represent upper case characters; printing means including magnets for printing characters, each magnet controlling the printing of both a lower case character and an upper case character; printing circuits including said magnets, each circuit including contact means coacting with the first contact means in both the lower case and upper case positions of the contact carrying members corresponding to two related upper and lower case characters, to thereby energize the magnet in the circuit including said contact members and contact; case shift mechanism including a plurality of case shift circuits, each circuit including a case shift magnet; shift contact means in the case shift circuits and engageable with the contact means in said first named circuits when the contact carrying members are in the upper case positions to select one of said case shift magnets, and means to move the contact means in said circuits and in the case shift circuits successively into engagement with the contact carrying members to print the characters represented thereby in succession.

21. A typewriting machine having case shiftable printing mechanism including printing circuits and case shift circuits, character keys, a shift key; storage means controlled by said keys for retaining representations of the characters corresponding to the keys, including the case shifted characters, said storage means including contact elements settable under control of the character keys to represent one case and further settable under control of the shift key to represent a different case; and means controlled by said contact elements for operating the printing mechanism to print the characters represented by said contact elements, said operating means including contact means in said circuits movable to successively engage the contact elements to select either a printing circuit alone, or both a printing circuit and a case shift circuit according to the positions of the contact elements.

22. A typewriting machine comprising printing mechanism, including a series of type bars each having three type characters, including case shifting means to select any one of the types on a type bar, and including magnets for controlling operation of the type bars and case shifting means; character keys, a shift key, character storage means including character storing contact members settable to represent any of the characters printed by said type bars, means controlled by the keys for setting said contact members, contact closing means engageable with said members to select said type bar and case shifting magnets for operation, and means to engage the contact closing means with said contact members seriatim.

23. In a typewriting machine, printing mechanism including a series of type bars and type bar circuits, character keys, a shift key, a series of contact members settable to different positions to represent the different characters corresponding to said keys including case shifted characters, means controlled by said character keys and shift key for setting said contact members, and means controlled by said contact members for selecting said type bar circuits, including an electrical sensing device including a carriage having contact means movable transversely of the setting movement of said members to successively sense their positions and close the type bar circuits seriatim.

24. In a typewriting machine, printing mechanism including selectable printing magnets, character keys, a series of contact members variably settable under control of the keys to represent by their positions any of said elements, contact means movable transversely of the setting movement of said members to successively engage said contact members to select said magnets for operation one at a time; means controlled by said keys for variably setting said contact members, including setting members, each corresponding to a key and a carriage for said setting members movable transversely of the first members to selectively set said first members successively to thereby store a complete line to be printed by said elements; and means to render the contact means operative.

25. A composing machine comprising printing means; operating means for the printing means, including printing, shift, and spacing circuits; a keyboard comprising character space and shift keys; character storage means including a series of contact devices each corresponding to a character space or position in a composed line and settable to represent such character; means controlled by said keyboard for setting said devices to represent the characters and spaces of a line to be printed by the printing mechanism, including means controlled by the shift key to set said devices to represent case shifted characters; and means to successively sense the settings of said devices and jointly therewith close said circuits to print said line.

26. In a machine of the class described, the combination of character keys; character storage means including a series of storage members each settable to any one of a plurality of positions representative of all of the characters printed; means controlled by the character keys for setting said storage members to represent a line of characters; upper and lower case printing mechanism; and means controlled by the positions of the storage members for selecting the printing members and for printing the characters and the cases thereof in accord with the operated character keys, said printing mechanism operating means including a source of energy independent of the energy applied in the operation of the operated character keys.

27. In a machine of the class described, the combination of character keys; character storage means including a series of storage members each settable to any one of a plurality of positions representative of all of the characters printed; means controlled by the character keys for setting said storage members to represent a line of characters; upper and lower case printing mechanism; and means controlled by the positions of the storage members for selecting the printing members and for printing the characters and the cases thereof in accord with the operated character keys, said printing mechanism operating means including a source of energy independent of the energy applied in the operation of the operated character keys and further including a print key for initiating the operation of said printing mechanism.

28. In a machine of the class described, the combination of character keys; character storage means including a series of storage members each settable to any one of a plurality of positions representative of all of the characters printed; means controlled by the character keys for setting said storage members to represent a line of characters; upper and lower case printing mechanism; and means controlled by the positions of the storage members for selecting the printing members and for printing the characters and the cases thereof in accord with the operated character keys, said printing mechanism operating means including an electrical source of energy independent of the energy applied in the operation of the operated character keys.

29. In a machine of the class described, the combination of character keys; character storage means including a series of storage members each settable to any one of a plurality of positions representative of all of the characters printed; means controlled by the character keys for setting said storage members to represent a line of characters; upper and lower case printing mechanism; and means controlled by the positions of the storage members for selecting the printing members and for printing the characters and the cases thereof in accord with the operated character keys, said printing mechanism operating means including an electrical source of energy independent of the energy applied in the operation of the operated character keys and further including a print key for initiating the operation of said printing mechanism.

30. In a machine of the class described, the combination of character keys; character storage means including a series of storage members each settable to any one of a plurality of positions representative of all of the characters printed; means controlled by the character keys for setting said storage members to represent a line of characters; indicator members driven by the set storage members for indicating the line to be printed; upper and lower case printing mechanism; and means controlled by the positions of the storage members for selecting the printing members and for printing the characters and the cases thereof in accord with the operated character keys, said printing mechanism operating means including a source of energy independent of the energy applied in the operation of the operated character keys.

31. In a machine of the class described, the combination of character keys; character storage means including a series of storage members each settable to any one of a plurality of positions representative of all of the characters printed; means controlled by the character keys for setting said storage members to represent a line of characters; indicator members driven by the set storage members for indicating the line to be printed; an error key for correcting the set storage members and therewith the operated indicator members; upper and lower case printing mechanism; and means controlled by the positions of the storage members for selecting the printing members and for printing the characters and the cases thereof in accord with the operated character keys, said printing mechanism operating means including a source of energy independent of the energy applied in the operation of the operated character keys.

ROBERT S. WALLACH.